US009953022B2

(12) United States Patent
Haine et al.

(10) Patent No.: US 9,953,022 B2
(45) Date of Patent: Apr. 24, 2018

(54) NATURAL LANGUAGE METRIC CONDITION ALERTS

(71) Applicant: SuccessFactors, Inc., South San Francisco, CA (US)

(72) Inventors: Dominic Philip Haine, San Francisco, CA (US); Michael Strezo, San Mateo, CA (US); Michel Angelo Capraro, San Francisco, CA (US); Lyndal Hagar, San Francisco, CA (US); Anthony Ashton, San Mateo, CA (US); Laesa Bolwell, Brisbane (AU); Dmitri Krakovsky, San Francisco, CA (US); Thor Axel Ahlberg, Brisbane (AU)

(73) Assignee: SuccessFactors, Inc., San Mateo, CA (US)

( * ) Notice: Subject to any disclaimer, the term of this patent is extended or adjusted under 35 U.S.C. 154(b) by 0 days.

(21) Appl. No.: 15/074,944

(22) Filed: Mar. 18, 2016

(65) Prior Publication Data
US 2016/0203117 A1    Jul. 14, 2016

Related U.S. Application Data

(63) Continuation of application No. 13/646,609, filed on Oct. 5, 2012, now Pat. No. 9,323,736.

(51) Int. Cl.
*G06F 17/27*    (2006.01)
*G06F 17/24*    (2006.01)
*G06Q 10/06*    (2012.01)

(52) U.S. Cl.
CPC ......... *G06F 17/248* (2013.01); *G06Q 10/067* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC .................................................. 704/1, 9, 10
See application file for complete search history.

(56) References Cited

U.S. PATENT DOCUMENTS

| | | |
|---|---|---|
| 5,226,118 A | 7/1993 | Baker |
| 5,983,170 A | 11/1999 | Goodman |
| 5,991,710 A | 11/1999 | Papineni et al. |
| 6,082,422 A | 7/2000 | Kaminski |

(Continued)

OTHER PUBLICATIONS

Henson, Writing for professional journals: Paradoxes and promises, JSTOR, 2001, pp. 765-768.*

(Continued)

*Primary Examiner* — Lamont Spooner
(74) *Attorney, Agent, or Firm* — Klarquist Sparkman, LLP

(57) ABSTRACT

Enterprise data sources can be monitored to detect metric conditions via rules, and alerts can be generated. The alerts can be presented as natural language descriptions of metric conditions. From an alert, the reader can navigate to a story page that presents additional detail and allows further navigation within the data. Additional detail presented can include a drill down synopsis, strategies for overcoming a negative condition, links to discussions within the organization about the condition, options for sharing or collaborating about the condition, or the like.

18 Claims, 32 Drawing Sheets

(56) References Cited

U.S. PATENT DOCUMENTS

| | | |
|---|---|---|
| 6,278,967 B1 | 8/2001 | Akers |
| 6,285,978 B1 | 9/2001 | Bernth |
| 6,314,411 B1 | 11/2001 | Armstrong |
| 6,463,404 B1 | 10/2002 | Appleby |
| 6,470,306 B1 | 10/2002 | Pringle |
| 6,760,695 B1 | 7/2004 | Kuno et al. |
| 6,999,916 B2* | 2/2006 | Lin .................. G06F 17/289 704/2 |
| 7,082,422 B1* | 7/2006 | Zirngibl .............. H04M 11/04 706/45 |
| 7,539,637 B2 | 5/2009 | Gatto |
| 8,275,771 B1 | 9/2012 | Malpani et al. |
| 8,543,374 B2 | 9/2013 | Dymetman |
| 9,323,736 B2 | 4/2016 | Haine et al. |
| 2002/0049790 A1 | 4/2002 | Ricker et al. |
| 2003/0004716 A1 | 1/2003 | Haigh et al. |
| 2003/0082508 A1 | 5/2003 | Barney |
| 2003/0149682 A1* | 8/2003 | Earley .................. G06Q 30/02 |
| 2003/0212648 A1* | 11/2003 | Cunningham ...... G06F 17/2247 |
| 2004/0006547 A1 | 1/2004 | Dehlinger et al. |
| 2004/0138944 A1 | 7/2004 | Whitacre et al. |
| 2004/0172410 A1 | 9/2004 | Shimojima et al. |
| 2004/0199541 A1 | 10/2004 | Goldberg et al. |
| 2004/0225648 A1 | 11/2004 | Ransom |
| 2005/0071217 A1 | 3/2005 | Hoogs et al. |
| 2006/0004703 A1* | 1/2006 | Spivack ............. G06F 17/3089 |
| 2006/0143034 A1* | 6/2006 | Rothermel ........... G06Q 10/10 705/301 |
| 2006/0149716 A1* | 7/2006 | Polo-Malouvier ........ G06F 17/30554 |
| 2006/0200338 A1* | 9/2006 | Cipollone ........... G06F 17/2735 704/4 |
| 2007/0005297 A1 | 1/2007 | Beresniewicz et al. |
| 2007/0050279 A1 | 3/2007 | Mannion |
| 2007/0133756 A1* | 6/2007 | Graves, III .......... G06Q 10/109 379/37 |
| 2007/0265866 A1 | 11/2007 | Fehling et al. |
| 2008/0065491 A1* | 3/2008 | Bakman ............... G06Q 30/02 705/14.41 |
| 2008/0183525 A1 | 7/2008 | Tsuji |
| 2008/0221868 A1 | 9/2008 | Melnick et al. |
| 2009/0083131 A1* | 3/2009 | Nos .................. G06Q 30/0201 705/7.29 |
| 2009/0089126 A1* | 4/2009 | Odubiyi ............... G06F 17/271 705/7.39 |
| 2009/0125450 A1 | 5/2009 | Mannion |
| 2009/0171927 A1 | 7/2009 | Nesamoney et al. |
| 2009/0292525 A1 | 11/2009 | Goishi |
| 2010/0033486 A1 | 2/2010 | Dahlen |
| 2010/0070448 A1* | 3/2010 | Omoigui ............. H01L 27/1463 706/47 |
| 2010/0094839 A1* | 4/2010 | Brach .................. G06Q 10/107 707/705 |
| 2010/0146491 A1 | 6/2010 | Hirano et al. |
| 2010/0223047 A1 | 9/2010 | Christ |
| 2010/0250307 A1* | 9/2010 | Hollas ................ G06Q 10/0635 705/35 |
| 2010/0318398 A1 | 12/2010 | Brun et al. |
| 2010/0332337 A1* | 12/2010 | Bullock ................. G06Q 20/12 705/26.82 |
| 2011/0040440 A1 | 2/2011 | De Oliveira |
| 2011/0154241 A1 | 6/2011 | Skidmore |
| 2011/0178791 A1 | 7/2011 | Stymne et al. |
| 2011/0184719 A1 | 7/2011 | Christ |
| 2012/0016678 A1* | 1/2012 | Gruber ................ G06F 17/3087 704/275 |
| 2012/0101804 A1 | 4/2012 | Roth et al. |
| 2012/0130778 A1 | 5/2012 | Cotton |
| 2012/0144325 A1* | 6/2012 | Mital ..................... G06F 9/4446 715/763 |
| 2012/0166616 A1* | 6/2012 | Meehan ............. G06Q 10/0639 709/224 |
| 2012/0289147 A1* | 11/2012 | Raleigh ................ H04L 67/2847 455/3.06 |
| 2013/0006954 A1 | 1/2013 | Nikoulina et al. |
| 2013/0031506 A1 | 1/2013 | Diaz |
| 2013/0080207 A1 | 3/2013 | Lyras |
| 2013/0094767 A1* | 4/2013 | Cardno ................. G06T 7/0085 382/199 |
| 2013/0103174 A1* | 4/2013 | Stahley .................... G06F 17/00 700/97 |
| 2013/0117300 A1* | 5/2013 | Talwar .............. G06F 17/30699 707/769 |
| 2013/0124194 A1 | 5/2013 | Nadal |
| 2013/0164712 A1 | 6/2013 | Hunt |
| 2013/0268285 A1* | 10/2013 | Backes .................. G06Q 50/22 705/2 |
| 2014/0044307 A1* | 2/2014 | Kenagy .................... G06K 9/20 382/103 |
| 2014/0100846 A1 | 4/2014 | Haine et al. |
| 2014/0100901 A1 | 4/2014 | Haine et al. |
| 2014/0100923 A1 | 4/2014 | Strezo et al. |

OTHER PUBLICATIONS

Matheus et al. (Matheus, An application of KEFIR to the analysis of healthcare information), 1994, ACM pp. 1-11.*

"Cornerstone, Kenexa, Monster, SHL, SuccessFactors, Workday among Scores of Vendors . . . " Marketwire, Oct. 2, 2012, 8 pages.

Seitz, "Narrative Science Turning Big Data into Plain English," Investors.com, Aug. 21, 2012, 4 pages.

Slocum, "Stories over spreadsheets," O'Reilly radar, Jun. 14, 2012, 3 pages.

"Let our Software Do the Writing for You," Automated Insights, automatedinsights.com, visited Oct. 4, 2012, 6 pages.

Procopio, "Automated Insights Powers Millions of Fantasy Football recaps for Yahoo!" TechJournal, Sep. 11, 2012, 3 pages.

"Quill™," Narrative Science Technology page, www.narrativescience.com, Oct. 4, 2012, 1 page.

"Natural Language Generation," Wikipedia, visited Oct. 4, 2012, 5 pages.

European Search Report, issued in European Patent Application No. 13004701.2-1955 (from corresponding European application) dated Jan. 1, 2014, 5 pages.

Decker et al., "Results of the 2002 AHCA Survey of Nursing Staff Vacancy and Turnover in Nursing Homes," www.ahca.org, 2003, pp. 1-44.

Henson, "Writing for Professional Journals" Paradoxes and Promises, JSTOR, 2001, pp. 765-768.

Asan, "HR Metrics—Slide Share," Slide-Share.net, 2008, pp. 1-8.

European Search Report, issued in European Patent Application No. 13004699.8-1955 (from European application corresponding to U.S. Appl. No. 13/646,601), dated Jan. 20, 2014, 5 pages.

European Search Report issued in European Patent Application No. 13004700.8-1955 (from European application corresponding to U.S. Appl. No. 13/646,595), dated Jan. 1, 2014, 5 pages.

Windows 7 Security—Everything you need to know, published Oct. 9, 2009, by Dedoimdeo; Screen captured Sep. 9, 2010; http:www.dedoimedo.com/computers/windows-7-security.html, 19 pages.

Reiter, NLG vs Templates, arXivpreprint comp-lg/9504013, 1995, pp. 1-11.

Xiao-hong, "The Unconventional Choices of Person Deixis and Its Pragmatic Analysis," *Shandong Foreign Languages Teaching Journal*, Issue 2 on 2003, 4 pages, with machine English translation of 10 pages (Feb. 2003).

* cited by examiner

2500

2800

2900

3000

NATURAL LANGUAGE METRIC CONDITION ALERTS

CROSS REFERENCE TO RELATED APPLICATION

This application is a continuation of U.S. patent application Ser. No. 13/646,609, filed on Oct. 5, 2012, which is hereby incorporated herein by reference.

BACKGROUND

Business management requires human talent. However, to succeed in today's business climate, managers must also take advantage of advanced data processing technologies such as business intelligence, online analytical processing, and global communications.

Even in a modest business enterprise, the amount of business intelligence information that could possibly be presented to managers is beyond overwhelming. As increased responsibility is placed on managers, they are expected to monitor, review, and analyze more and more reports, reminders, information, charts, emails, and raw data. Spending such time immersed in the world of big data leaves little room to take meaningful management actions, leading to paralysis. For large enterprises or higher level managers, the problems are multiplied even further.

A possible solution to the information overload problem is to employ a data analyst to monitor the data and identify the most significant data, which is then provided to the manager for consumption and further analysis. The data analyst can become a specialist who can use the latest business intelligence tools to uncover trends in the data and provide reports to the manager. However, the data analyst is then interposed between the manager and the data. As a result, the manager is disconnected from the data and must rely on the data analyst, who may not be completely familiar with the manager's particular business objectives and goals.

And, even if the data analyst provides sufficient information for the manager to discover a problem, the manager is still left with the challenge of exploring causes of the problem and then applying managerial talent to solve the problem. These further tasks typically require further analysis, communication, and the like. If the manager is dependent on the data analyst, such a process can involve multiple rounds of back-and-forth communication between the manager and the analyst, leading to further delay and disconnect.

Still, the contemporary business environment demands that a manager take on added responsibility and manage a large variety of business factors via advanced technologies. Although current approaches can provide a wide variety of business intelligence functionality, the end result is typically information overload or information disconnect. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Enterprise data sources can be monitored to detect business metric conditions with business metric condition detection rules, and alerts can be generated accordingly. A headline format can be used to communicate alert conditions in natural language that is easy for managers to understand.

Alerts can be presented in a reader-centric presentation ranked based on severity. From the alert, the reader can navigate to a story page that presents additional detail and allows further navigation within the data. Additional detail presented can include a drill down synopsis, strategies for overcoming a negative condition, links to discussions within the organization about the condition, options for sharing the condition, working collaboratively on the condition, or the like.

Still other features, such as automatic thresholds via industry benchmarking, automatic drill down, and numerous others can be supported.

As described herein, a variety of other features and advantages can be incorporated into the technologies as desired.

DETAILED DESCRIPTION

EXAMPLE 1

Exemplary Overview

The technologies described herein can be used for dynamic, user-centric rule-based business metric condition alerts. Adoption of the technologies can provide efficient techniques for monitoring important metric conditions within large collections of data.

The technologies can be helpful for those wishing to manage people and resources in a business enterprise while reducing the complexities related to monitoring large data sets. Information overload and specialized analyst intermediaries can be avoided. Beneficiaries include managers who wish to effectively detect anomalies or emergent conditions in a business enterprise. Analysts can also indirectly benefit from the technologies because they can easily share their data analysis techniques and expertise with users.

Using the technologies herein, managers can not only better detect anomalies in the enterprise, they can communicate and collaborate more effectively about them. Various features herein provide functionality that represents a paradigm shift in how managers can better apply their talents in a business organization.

EXAMPLE 2

Exemplary System Implementing Business Metric Condition Alerts

Figure 1:
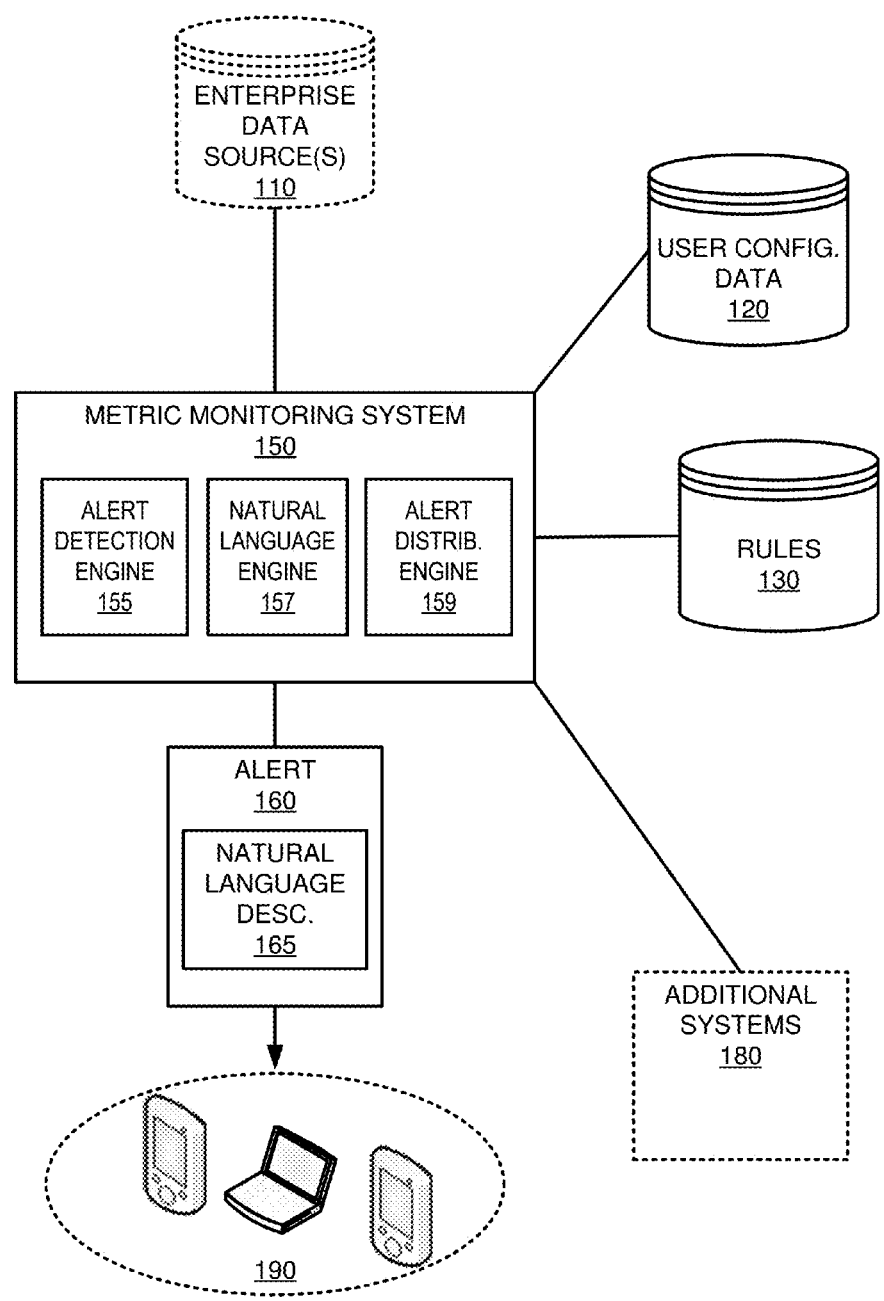
FIG. 1 is a block diagram of an exemplary system implementing rule-based business metric condition alerts.

FIG. 1 is a block diagram of an exemplary system 100 implementing business metric condition alerts as described herein.

In the example, a business metric monitoring system 150 monitors business metric conditions in one or more data sources 110. The monitoring system 150 can access user configuration data 120, and business metric condition detection rules 130 to generate alerts 160 that include a natural language description 165 for display on user devices 190. The monitoring system 150 can also access benchmarks as described herein.

The system 100 can be described as a single, unified system, or one or more client systems and one or more server systems. For example, the monitoring system 150 and enterprise data source(s) 110 can be considered a separate system, as can the client devices 190. The monitoring system 150 can interact with additional systems 180, such as productivity, email, collaboration, social networking, or other communication software systems.

In the example, the monitoring system 150 comprises an alert detection engine 155 configured to detect occurrences of the business metric conditions in the data sources 110 according to (e.g., by applying) the rules 130, a natural language engine 157 configured to generate natural language descriptions of the detected occurrences of the business metric conditions (e.g., describe the occurrences in natural language), and an alert distribution engine 159, configured to distribute the alerts according to configuration information (e.g., user configuration data 120 indicating to what destinations alerts are to be distributed).

As described herein, the business condition metric rules 130 can specify respective business condition metric conditions under which an alert is to be generated.

In practice, the systems shown herein, such as system 100 can vary in complexity, with different functionality, components of differing complexity, and the like. For example, templates can be included to facilitate generation of user interfaces, preconfigured rules can be provided, default settings can simplify configuration, and the like. Additional features relating to security and redundancy can also be included.

The system 100 and any of the other systems described herein can be implemented in conjunction with any of the hardware components described herein, such as the computing systems described below (e.g., processing units, memory, and the like). In any of the examples herein, the inputs, outputs, and engines can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a local application without concern over the actual computing infrastructure needed or used to operate the servers, which can be administered by a business entity different from the client user organization.

EXAMPLE 3

Exemplary Method Implementing Business Metric Condition Alerts

Figure 2:
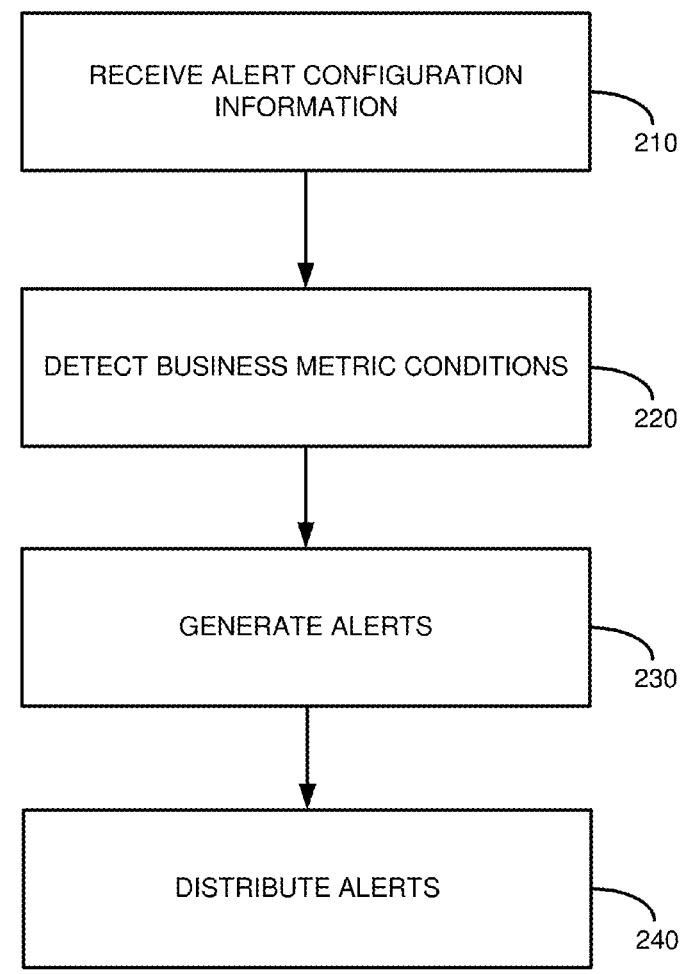
FIG. 2 is a flowchart of an exemplary method of implementing rule-based business metric condition alerts.

FIG. 2 is a flowchart of an exemplary method 200 of implementing rule-based business metric condition alerts and can be implemented, for example, in the system shown in FIG. 1.

At 210, alert configuration information is received. For example, configuration information can be received indicating a business metric to be monitored, a business metric condition, and the like. Such configuration information can be any of that described herein, including parameters for alert rules, which rules are run for which users, alert distribution options, and the like. Default or automatic configuration information can be supported to avoid a lengthy configuration process.

At 220, business metric conditions for business metrics are detected. For example, based on data in the data sources, it can be detected that a threshold for a particular business metric has been exceeded (e.g., as specified by a rule).

At 230, alerts are generated. As described herein, natural language descriptions of the metric condition for the respective alerts can be generated. Such a description can be of the headline format described herein.

At 240, the alerts are distributed. As described herein, a variety of distribution options can be supported.

Additional processing can occur at a client device. For example, conditions for the alerts are explored. For example, a receiving user may navigate within an alert. Such navigation can be processed locally (e.g., using data sent with the alert or by accessing the data sources). Or, navigation can be supported by interacting with the metric monitoring system (e.g., by fulfilling requests from the client to navigate within the alert) or another system.

Further information regarding the alert can be provided (e.g., in the form of a story page). Further navigation within the information can be supported to uncover still further information. Such an approach can provide an invaluable tool for discovering the root causes of a condition, communicating and collaborating with others, and otherwise applying managerial talents to the situation. As described herein, mobile versions of user interfaces can be supported, allowing managers to manage effectively via mobile device. Integration into existing systems can also be supported.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

EXAMPLE 4

Exemplary Data Sources

In any of the examples herein, the technologies can use one or more enterprise data sources as input. Such data sources typically indicate metrics for various aspects of the enterprise (e.g., sales and human resource information) over time. Accordingly, data from one time period can be compared against data from another time period; data from a current time period can be compared against a benchmark; data from a current time period can be compared for variance across similar or other time periods; and the like.

The data sources can support online analytical processing (OLAP) techniques, such as adding or removing certain dimensions, drilling down, slicing and dicing, consolidating data via rollups and aggregation, and the like.

EXAMPLE 5

Exemplary Metric Framework

In any of the examples herein, a business metric framework can support the technologies. For example, an infrastructure can be provided that manages and measures a wide variety of business metrics, such as those related to human resources, finance, sales, and the like.

As described herein, the framework can provide information indicating segments of populations monitored. In practice, such populations can take the form of employees of a business organization.

EXAMPLE 6

Exemplary Business Metrics

In any of the examples herein, a wide variety of business metrics can be measured. Such business metrics can relate to human resources (e.g., workforce profile, workforce productivity, workforce mobility, workforce development, workforce compensation and benefits, etc.), sales, finance, and the like.

In the realm of human resources, business metrics can take the form of attrition rate, management staffing factor, span of control, average time to start, new hire failure rate, turnover rate, and the like. As described herein, finer levels of detail (e.g., voluntary attribution rate for employees having 3-5 years tenure) can be supported.

Business metrics can take forms other than numbers. For example, during performance reviews, it may be determined that an employee is a high-potential employee. Such a determination can be made of record in a database and used as a dimension (e.g., high-potential or not) for setting a business metric condition, automatic drill down, or the like. In addition, any variety of metrics customized for a particular enterprise can be used.

EXAMPLE 7

Exemplary Alert User Interface

Figure 3:
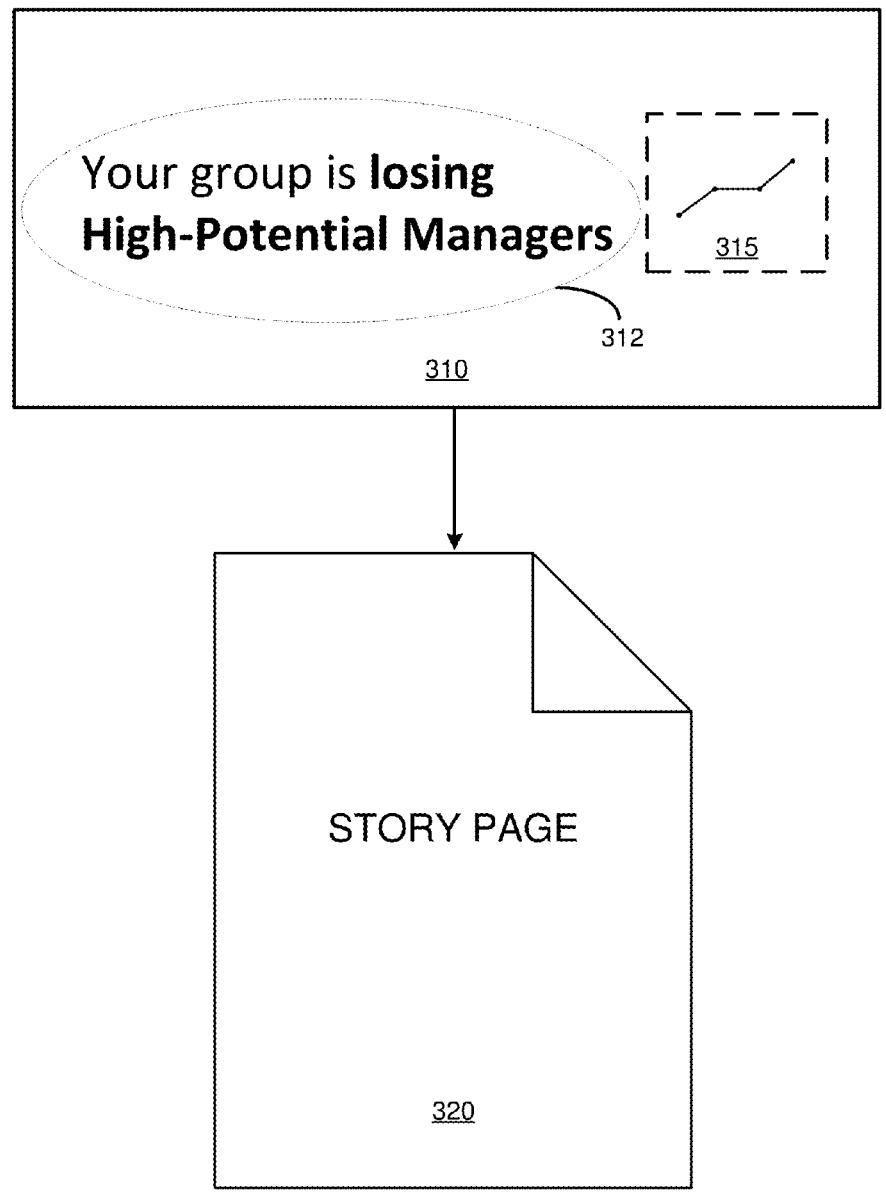
FIG. 3 is a screen shot of an exemplary business metric condition alert and shows navigation to a story page.

FIG. 3 is a screen shot of an exemplary business metric condition alert 310 and shows navigation to a story page. In the example, an alert 310 is displayed that comprises a natural language description 312 of the associated alert condition in headline format. The alert 310 can be presented as part of a ranked list of alerts as described herein.

The example also comprises a summary graph 315 that depicts the business metric condition. The graph 315 itself can provide additional functionality as described herein. Instead of a graph, a different indicator (e.g., an observed metric value relating to the alert, such as average sales amount) can be shown.

The alert 310 can support activation to provide additional information and functionality that is called a "story page" 320 herein. For example, activating (e.g., tapping, swiping, clicking, or the like) the alert 310 or a designated region or pane within the alert 310 can result in display of the story page 320. In practice, the alert in headline 310 can remain at the top of the story page. To emphasize that the information is expanding upon the alert, an appropriate animation can be provided (e.g., to show the story page emanating from the alert 310).

The story page 320 can include a rich description of the business metric condition for better understanding what is described in the headline. The story page 320 can also support a wide variety of functionality to help the reading user understand the alert condition, communicate the condition, collaborate with others about the condition, or otherwise take action with respect to the alert condition.

The story page 320 can subsequently be collapsed (e.g., to browse and activate other alerts).

EXAMPLE 8

Exemplary Method Displaying Business Metric Condition Alerts

Figure 4:
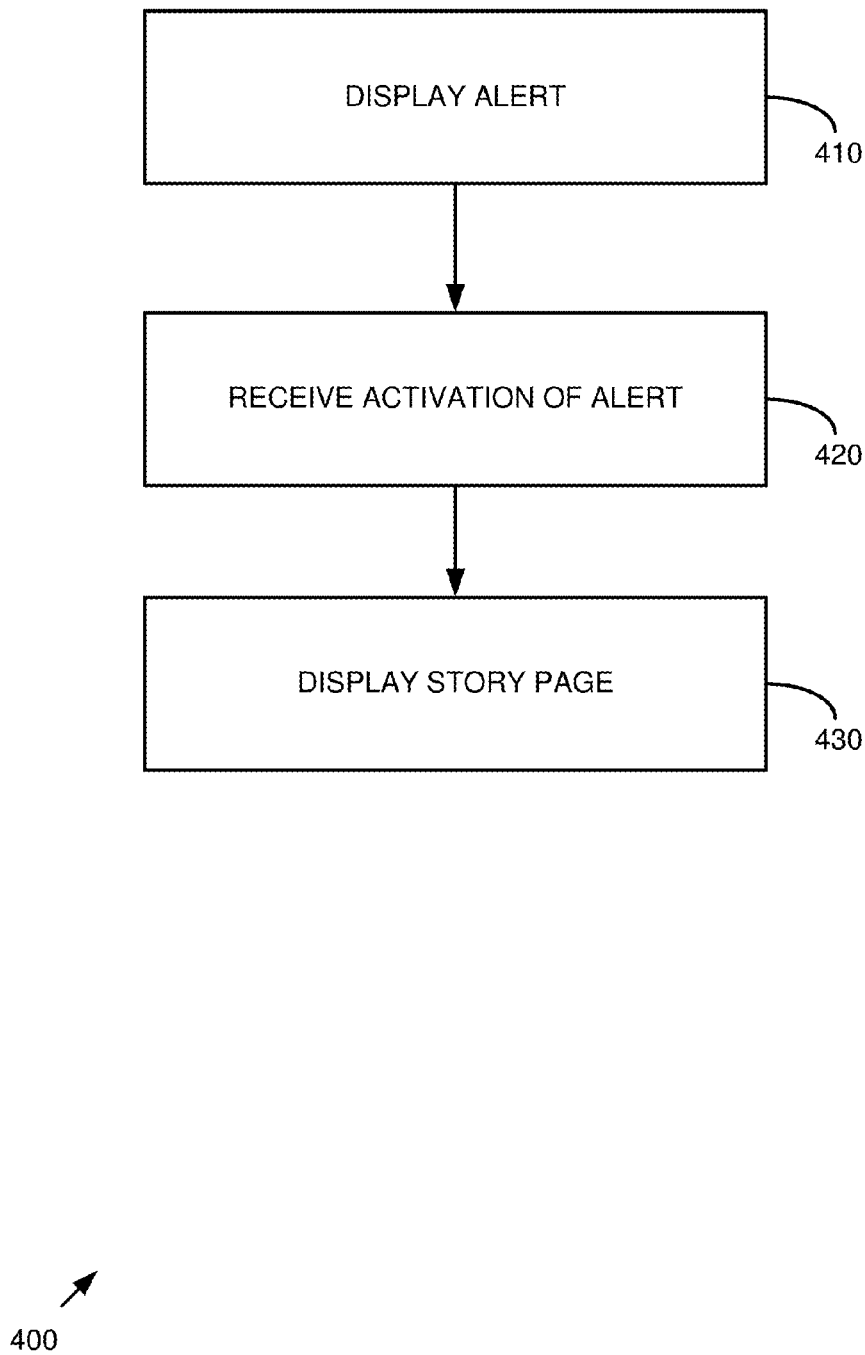
FIG. 4 is a flowchart of an exemplary method of displaying business metric condition alerts.

FIG. 4 is a flowchart of an exemplary method 400 of displaying business metric condition alerts and can be implemented, for example, via the interface shown in FIG. 3.

At 410, an alert is displayed. The alert can comprise a natural language description of a business metric condition detected for a business metric within a business enterprise as described herein. As described herein, such an alert comprise natural language in a headline format and be included in a list of ranked alerts for consideration by a user.

At 420, an activation of the alert is received as described above.

At 430, responsive to activation of the alert, the story page associated with the alert is displayed. A wide variety of functionality within the story page can be supported as described herein. The story page can comprise further detail about the business metric condition. For example, the story page can include a display of the business metric as observed for a plurality of data segments within the business enterprise (e.g., as a drill down synopsis).

The alert or an abbreviated version of it can be displayed at the top of the story page to provide context.

As described herein, the story page can subsequently be collapsed or closed responsive to a user activation (e.g., of the alert at the top of the story page, an area, such as a back arrow, within the story page or alert, or the like) or some other technique of navigating back to an original list of alerts can be supported. As a result, the alert is then displayed or continues to be displayed (e.g., in a list of alerts).

As a user navigates through the interface, various live queries can be issued by which the displayed data is determined. For example, when exploring dimensions within the data, a database facility, OLAP facility, or the like can be consulted to determine what data to display.

EXAMPLE 9

Exemplary Alerts

In any of the examples herein, an alert can take a variety of forms that communicate a business metric condition for eventual consideration by a user. The alerts can originate from analysis of one or more enterprise data sources with a plurality of business metric condition detection rules as described herein.

As described herein, a wide variety of functionality can be provided via the alert. For example, navigation to further data, configuration, communication, and collaboration functionality can be accessed via the alert.

EXAMPLE 10

Exemplary Ranked List of Alerts

In any of the examples herein, an alert can be presented as part of a ranked list of alerts. For example, when such alerts are of headline format, a headline page of alerts can be presented that comprises a list of alerts in headline format. When generating such a list, the descriptions can be ranked for display.

The alerts can be ranked according to severity by a variety of techniques.

As described herein, another technique is to choose the top n alerts based on how much an observed metric exceeds its threshold (e.g., and tolerance). The bottom n alerts can also be shown and ranked accordingly (e.g., shown after the top n alerts).

EXAMPLE 11

Exemplary Summary Graph

In any of the examples herein, an alert can comprise a summary graph that depicts the business metric condition. For example, the graph can succinctly communicate the progress of the associated business metric over time (e.g., as progressing over time periods). A trendline graph for the business metric condition can be shown. Other types of summary graphs can be implemented.

In practice, the summary graph can be of a minimalist, easy-to-understand format (e.g., a sparkline graph for the business metric condition), showing a few data points and perhaps a horizontal line representing a threshold (e.g., from the appropriate rule) and/or tolerance level. Multiple graph lines can be shown (e.g., when comparing a group to average or the like). Predicted values can be shown via dashed lines.

Besides line graphs, other displays (e.g., circular graph showing percent completion or the like) can be supported.

EXAMPLE 12

Exemplary Story Page

Figure 5:
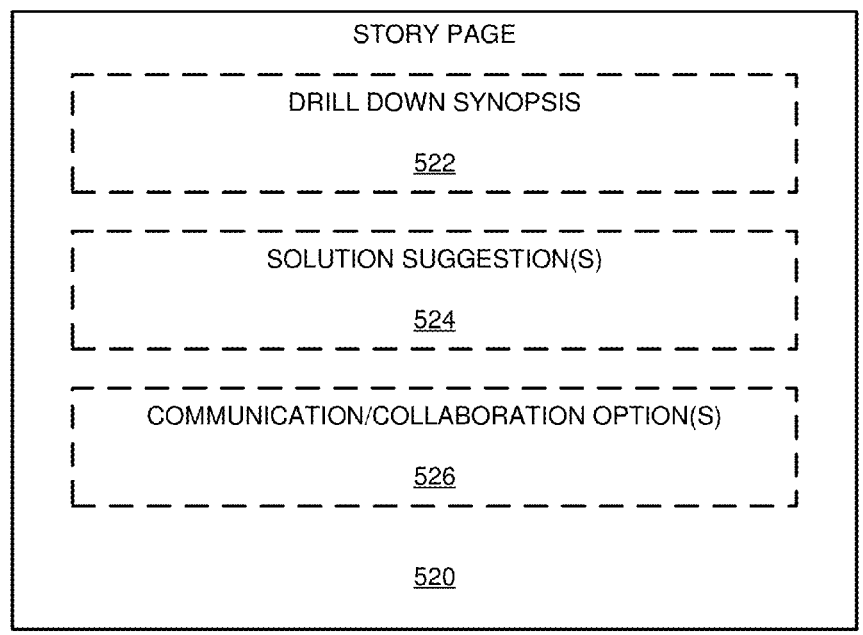
FIG. 5 is a screen shot of an exemplary story page.

FIG. 5 is a screen shot of an exemplary story page 500 that can be used with any of the examples herein. As described herein the story page can provide tools for further navigating within the data, taking action, collaborating with others, and the like.

A drill down synopsis 522 can be displayed to provide quick color on the business metric condition (e.g., which segments are driving the metric). As described herein, responsive to activation of the synopsis 522, further detail can be shown. The synopsis 522 can be based on dimensions (e.g., 1250) stored in a rule.

In some cases, the business metric condition is a negative business metric condition. In such instances, a solution suggestions section 524 can display indications of solutions for remedying the negative business metric condition. Such indications can include a brief description, a number of further available solution resources, links to a strategy bank or the like as described herein.

The communication/collaboration options section 526 can provide one or more user interface elements for receiving an indication to share content from the story page or alert with another user.

Discussions within the organization relating to the business metric condition can also be shown as described herein.

A section for describing the possible causes of the metric condition can also be included.

A section identifying future risks associated with the business metric condition can also be included.

In addition, one or more sections can display analysis or status of one or more business metrics related to (e.g., other than) the subject one measured to generate the alert. Such business metrics can be analyzed according to any of the techniques for analyzing the subject business metric (e.g., drill down or the like) as described herein.

Still other possible sections can help explain the business metric condition, such as a drilldown on one of the metric inputs (e.g., the population of employees that terminated when analyzing a termination rate).

Additional content pages supporting the business metric can be linked from the story page. For example, such pages can provide the ability to see the details used as input to the metric calculation (e.g., the list of employees that were terminated for an attrition metric, a list of positions for a time-to-fill metric, or the like). Thus, when business metrics are calculated, the individual cases (e.g., the terminated employees) that result in the population count (e.g., 7) can be further analyzed. Such details can be supported by relevant segmentation for the input (e.g., using dimensions supplied as part of a rule).

Depending on the business metric, different approaches and combinations of the technologies may be desired. Story page templates can be constructed to leverage knowledge regarding what are the most appropriate sections to display for a given business metric. A rule can be associated with such a template. Templates can be customized as desired.

EXAMPLE 13

Exemplary Drill Down Synopsis

In any of the examples herein, a drill down synopsis can present abbreviated results of the automatic drill down technologies described herein. Such a synopsis can depict the top n segments (e.g., ranked by observed business metric). The bottom n segments can also be shown. Such information can be helpful to glean quick color on the situation and its root causes as well as to explore possible solutions.

EXAMPLE 14

Exemplary Solution Suggestions

In any of the examples herein, suggestions can be presented for remedying negative conditions. Such suggestions can be associated with the rule that triggered the alert. Links to a strategy bank as described herein can be supported.

EXAMPLE 15

Exemplary Communication Options

In any of the examples herein, communication and collaboration options can be presented within the story page. For example, email can be sent about the alert. Content from the alert can be automatically incorporated into a draft email.

EXAMPLE 16

Exemplary Discussions about the Business Metric

In any of the examples herein, a story page can include a section indicating discussions going on within the business enterprise about the business metric associated with the story page. For example, a list of key words can be associated with a business metric or rule.

A search across collaboration software, emails, or other communication software with the keywords can reveal discussions. A link to a particular discussion (e.g., or posting within the discussion) can be included on the story page. Responsive to activation of the link the discussion can be displayed. The search can be limited to members of the manager's group, and security and privacy settings can prevent viewing unauthorized data.

EXAMPLE 17

Exemplary Story Page User Interface

In any of the examples herein, an alert can be used to navigate to a user interface that displays further information about the associated business metric condition and allows further navigation within the data, along with communication and collaboration functionality. Such a user interface is sometimes called a "story page" or "full story page" because it gives a more complete description of the business metric condition.

Figure 6:
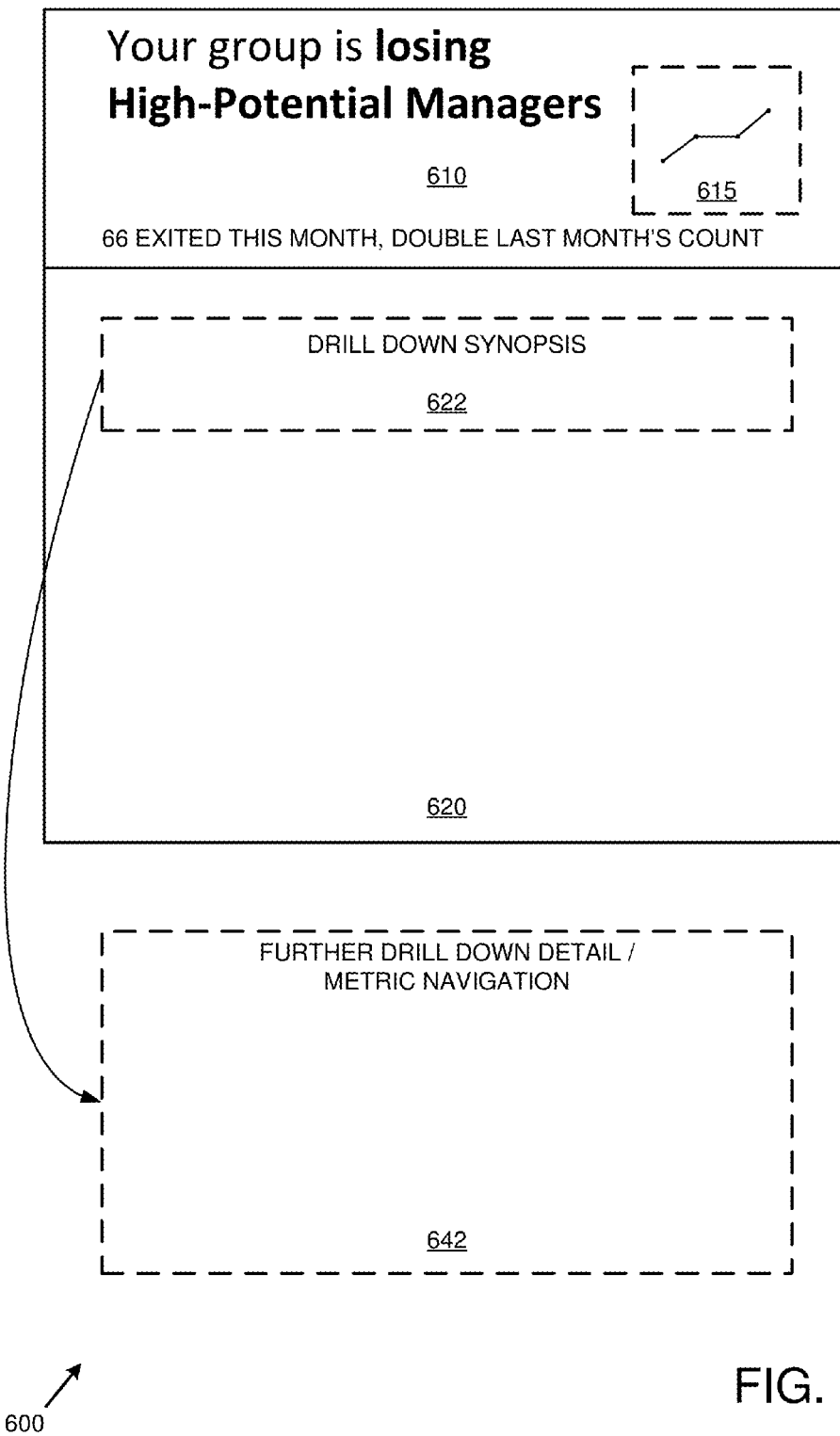
FIG. 6 is a screen shot of an exemplary story page and shows navigation to further drilldown detail and/or metric navigation from a drill down synopsis on a story page.

FIG. 6 is a screen shot of an exemplary story page and shows navigation to further drill down detail and/or metric navigation from a drill down synopsis on a story page. In the example, a depiction of the alert 610 and graphic 615 remain at the top of the story page after navigation to the story page 620. A brief indication of supporting data for the observed metric (e.g., 66 employees exited) is also included. Alternatively, a compressed version of the alert 610 can be shown.

In any of the examples herein, a display of a plurality of data segments within a business enterprise (e.g., on a story page) can comprise a drill down synopsis 622 of the business metric.

Responsive to activation of the synopsis, further drill down detail 642 (e.g., an expanded version of the synopsis 622) can be shown. As described herein, further analysis such as navigation within the data, sorting, and the like can be performed from the further drill down detail 642. Because the manager can freely move within the data beyond what was specified in the rule, such a user interface is sometimes called a "data playground." The manager can apply experience and other managerial skills to explore the data to find root causes and possible solutions.

EXAMPLE 18

Exemplary Method Displaying Story Page

Figure 7:
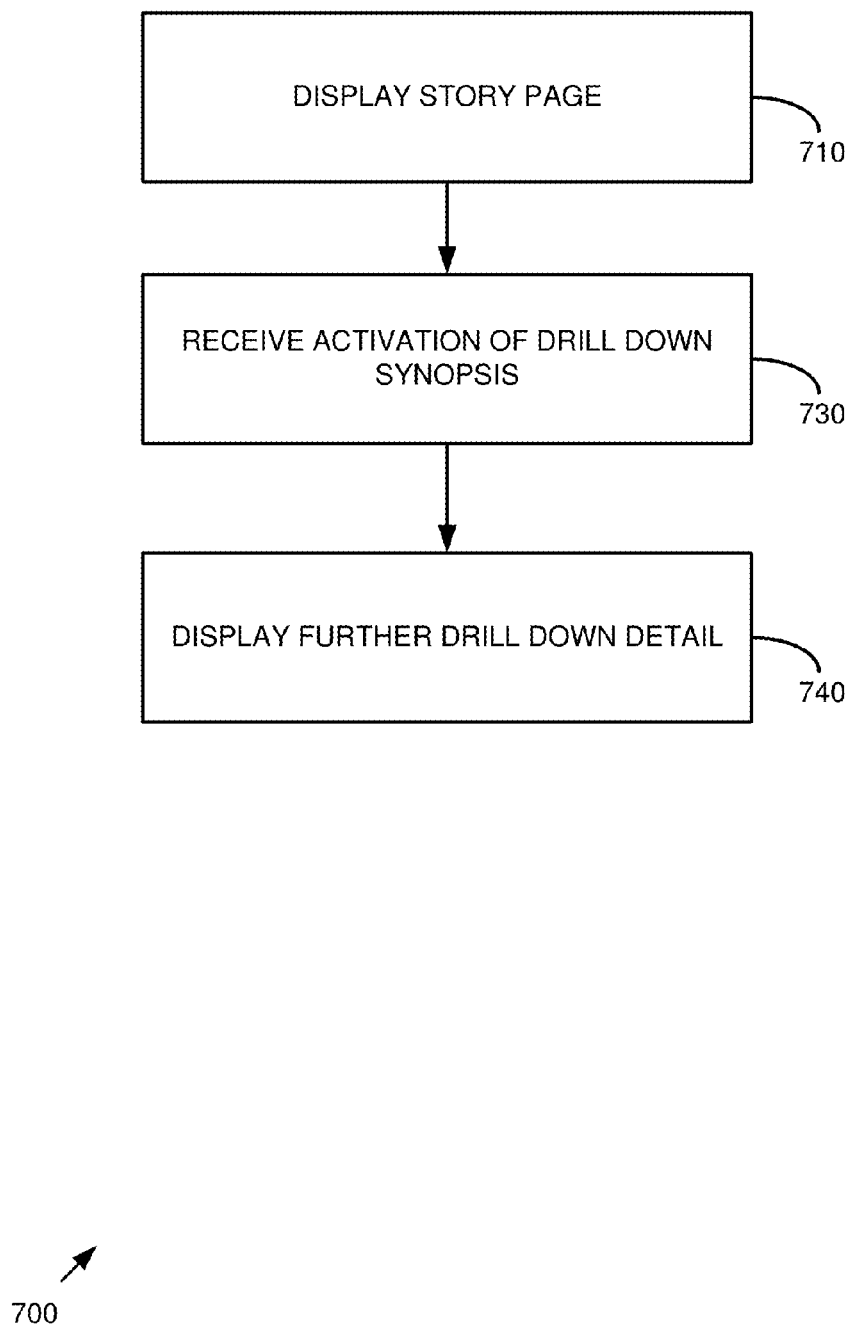
FIG. 7 is a flowchart of an exemplary method of processing activation of a drill down synopsis within a story page.

FIG. 7 is a flowchart of an exemplary method 700 of processing activation of a drill down synopsis within a story page and can be implemented, for example, via the interface shown in FIG. 6.

At 710, the story page is displayed. Any of the examples described herein can be used.

At 730, an activation of the drill down synopsis is received (e.g., via activation or an area, pane, or the like).

At 740, responsive to activation of the drill down synopsis, further drill down detail (e.g., an expanded version of the synopsis) is displayed. For example, additional (e.g., ranked) segments can be shown as described herein.

Subsequently, it is possible to return to the story page (e.g., by pressing a back button, a close icon, or the like).

EXAMPLE 19

Exemplary System Monitoring Business Metric Conditions

Figure 8:
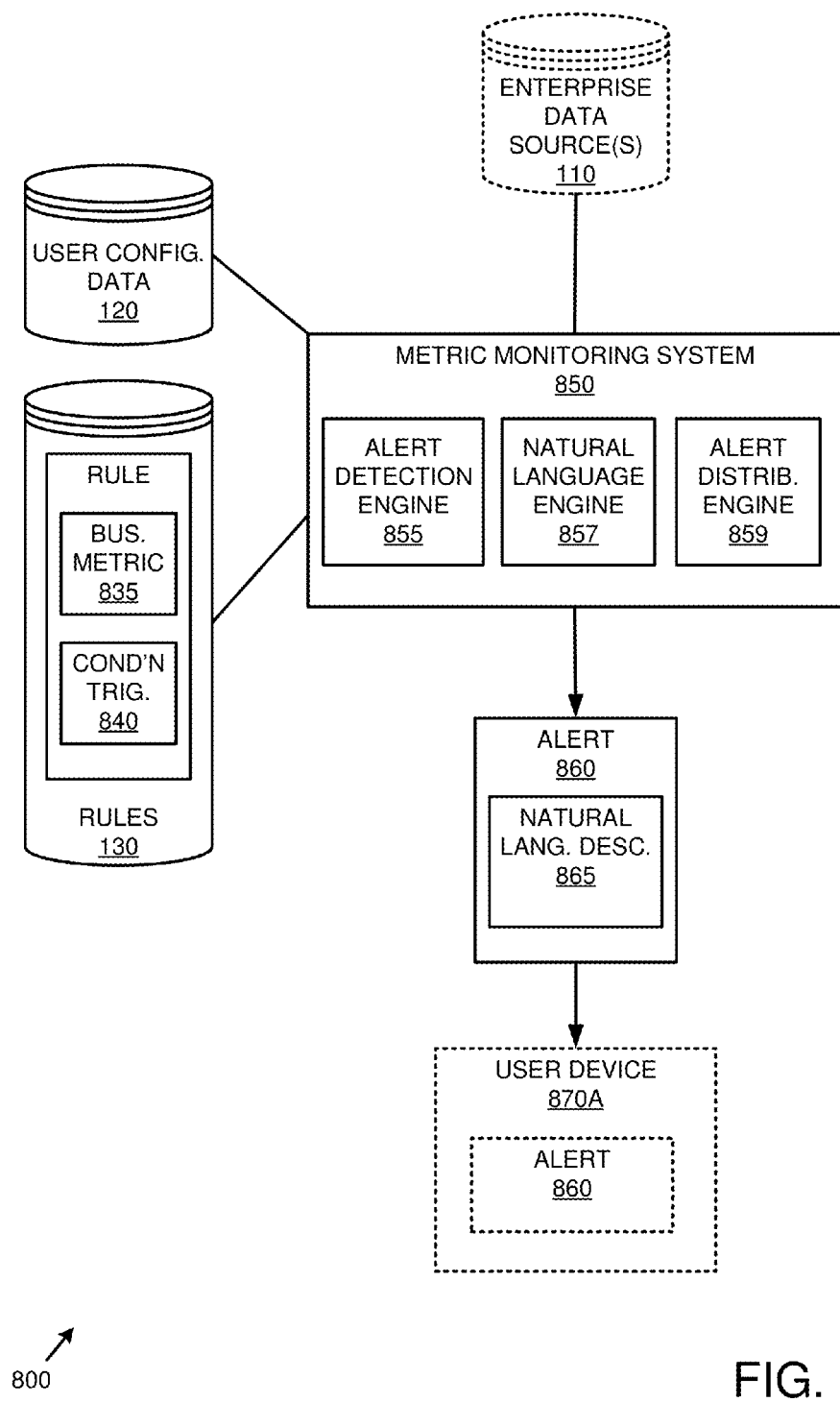
FIG. 8 is a block diagram of an exemplary system monitoring business metric conditions.

FIG. 8 is a block diagram of an exemplary system 800 monitoring business metric conditions. For purposes of context, one or more enterprise data sources 110 and user device 870 are shown. In the example, the monitoring system 850 monitors the data source 110 and generates an alert 860 for distribution to a user device 870A.

The metric monitoring system 850 accesses the user configuration data 120 and the stored metric condition detection rules 130 (e.g., comprising respective business metrics 835 and condition triggers 840) with an alert detection engine 855, which is configured to apply the rules against the enterprise data sources 110 and detect occurrences of the business metric conditions within the data for the business metric 835 as specified by the business metric condition detection rules (e.g., condition triggers 840 specified in the rules).

The rules specify respective business conditions under which an alert is to be generated. Upon detection of a condition specified by a rule, an alert 860 can be generated. As described herein, the alert can include a natural language description of the detected occurrences of the business metric condition as generated by the natural language engine 857. The engine 857 can be configured to generate natural language in any of a variety of human languages (e.g., English, German, French, Spanish, Italian, Chinese, Japanese, or the like) to support localization of the system 850.

The alert 860 can then be distributed via an alert distribution engine 859, which can support a variety of alert distribution channels (e.g., email, text, collaboration software, productivity software, or the like). Although the example shows distributing the alert 860 itself, an alternative implementation is to distribute a link to the alert, which can be hosted by the monitoring system 850, a content distribution network, or the like. The link can then be used to retrieve the alert. The engine 859 can be configured to distribute the natural language descriptions to users according to user preferences.

As shown, the alert 860 can include a natural language description 865. Such a description can be reader-centric (e.g., targeted to the reader using appropriate grammar as described herein) and in headline format as described herein.

In practice, the alert 860 (e.g., comprising the description 865) is eventually viewed by a user on a user device 870.

The alert can serve as context for further detail requested via the device (e.g., to get more information on the alert condition).

EXAMPLE 20

Exemplary Method Monitoring Business Metric Conditions

Figure 9:
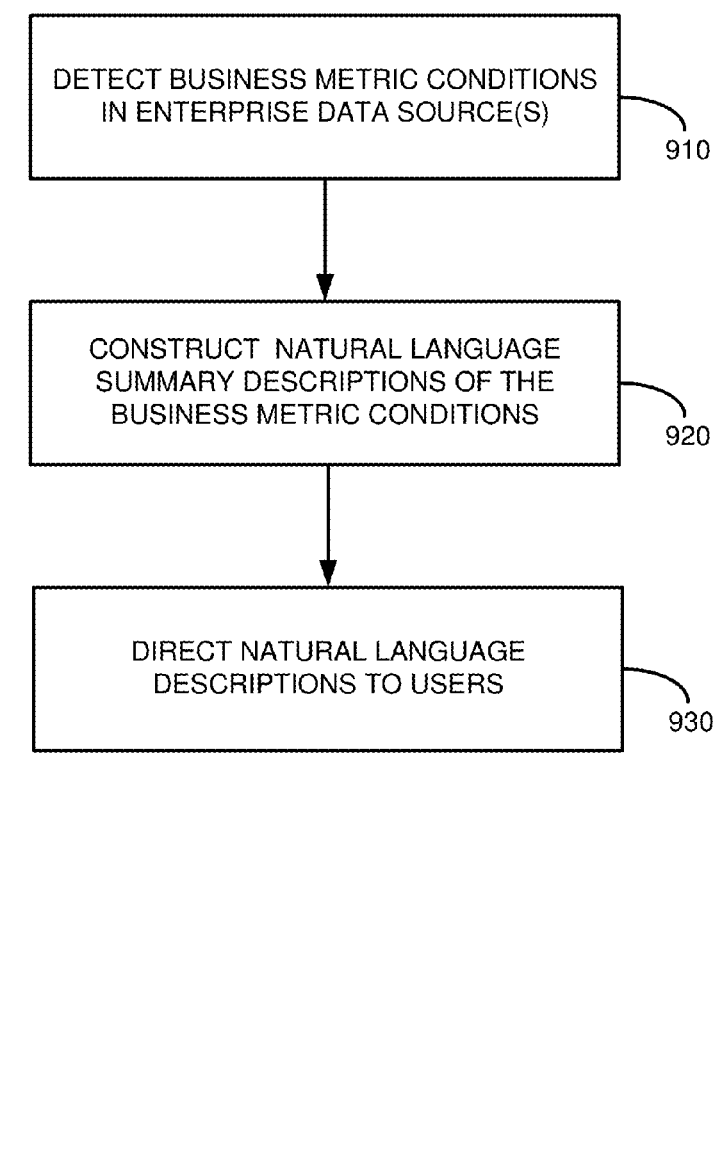
FIG. 9 is a flowchart of an exemplary method monitoring business metric conditions.

FIG. 9 is a flowchart of an exemplary method 900 monitoring business metric conditions and can be implemented, for example, in the system shown in FIG. 8.

At 910, business metric conditions occurring in one or more enterprise data sources are detected via business metric condition detection rules (e.g., associated with one or more user identities). For example, as described herein, business metric condition detection rules are configured to specify business metric conditions that trigger an alert. Automatic drill down can be implemented as described herein to detect conditions in population segments.

At 920, natural language summary descriptions of (e.g., reflecting) the respective business metric conditions are constructed. Such construction can rely on a wide variety of metadata to construct a meaningful, easy-to-understand description of the alert condition. Techniques such as ranking and color coding can be used to emphasize critical conditions. A user-centric description as described herein can be used. Metadata can include the user's persona to provide proper perspective in the description (e.g., so that the user's position in the enterprise hierarchy can be used to customize the description to meaningfully describe how the condition relates to the user in a user-centric way). Or, text templates can be organized so that an input parameter chooses text templates having a perspective-appropriate description.

At 930, the natural language summary descriptions of the alert conditions are directed to a user identity associated with the rule. For example, alerts can be distributed according to configuration information. For example, the descriptions can be distributed to user devices for reading by users. As described herein, descriptions can be distributed via a link rather than sending the descriptions themselves.

The descriptions can be ranked according to a ranking of the business metric conditions or other factors.

In practice, a rule can be associated with more than one user.

EXAMPLE 21

Exemplary Ranking

In any of the examples herein, alerts, descriptions, or the like can be ranked for display and then displayed according to the ranking. Such ranking can be done according to relative business metric conditions or the like. For example, ranking can be based on severity of the business metric condition or other factors (e.g., the most severe condition is listed first).

A configuration system can support various ranking schemes, which can set to vary depending on the user, business metric, or the like. Techniques such as stack ranking for alerts can make the alerts more easily understood by a reading user.

EXAMPLE 22

Exemplary Severity

As described herein, various rankings can be accomplished via severity. Severity can indicate how severe a business metric condition is, how important the business metric is, or the like. Severity can be calculated by determining an amount beyond target, amount contributing to being beyond a target, or the like. A metric having a higher severity can thus be ranked (e.g., placed higher) than a metric with a lower severity.

For example, certain business metrics can be categorized as important. The amount by which a metric exceeds its threshold can determine its severity. Weightings can be used to determine overall severity.

When performing automatic drill down metric observations, the amount by which a segment contributes to an overall metric can be used to determine severity and thus rank the segment.

Severity categories can be used to emphasize metrics or natural language. In such a case, a severity category can be determined with reference to a target (e.g., being beyond the target is a category, being beyond the target plus a tolerance is another category, and the like). Such severity categories can be explicitly represented as a value or implicit (e.g., by emphasizing natural language descriptions in a dictionary according to perceived severity).

EXAMPLE 23

Exemplary Automatic Drill Down

Figure 10:
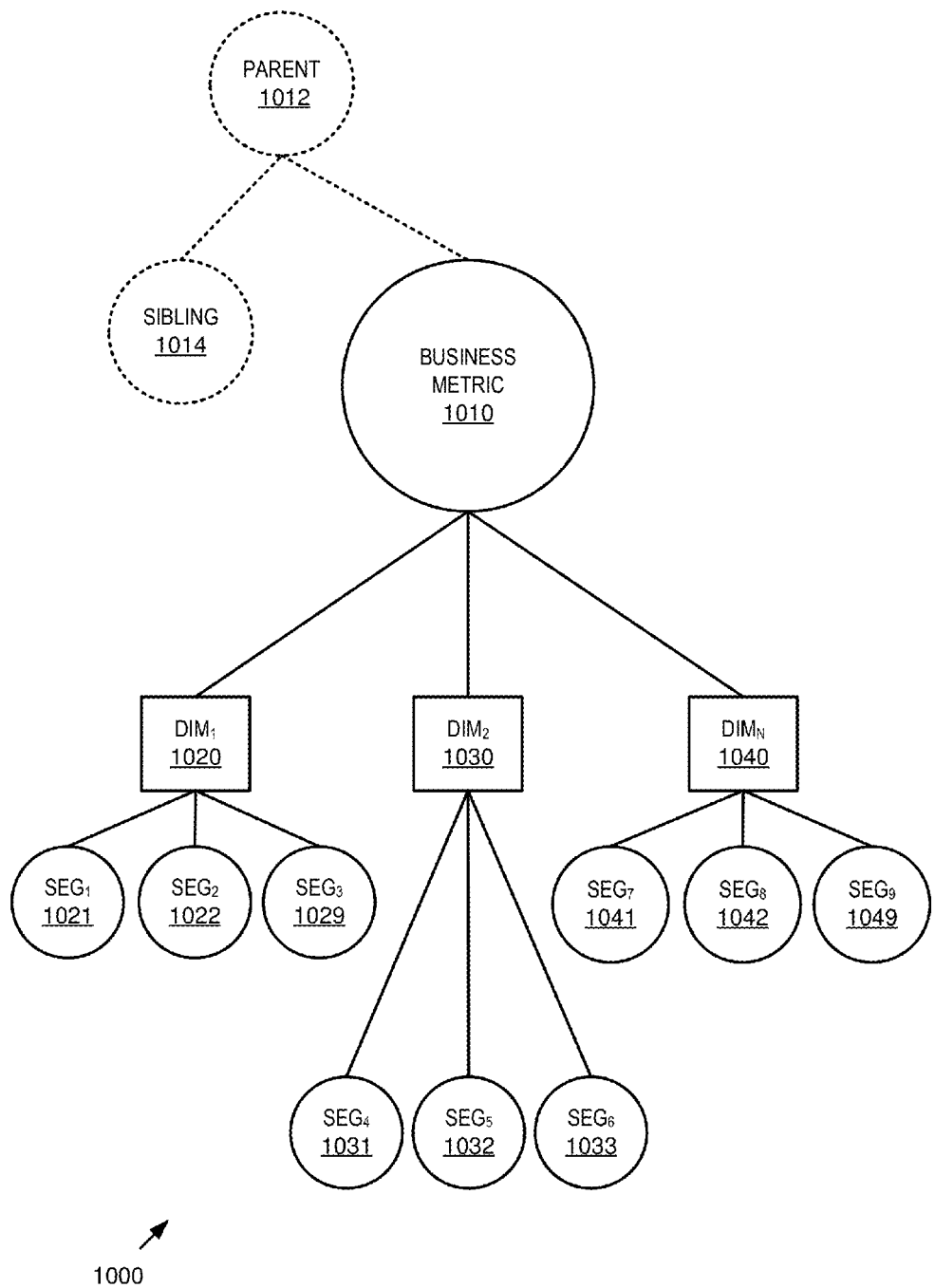
FIG. 10 is a block diagram showing an exemplary data hierarchy used in a metric framework for automatic drill down purposes.

FIG. 10 is a block diagram showing an exemplary data hierarchy 1000 used in a metric framework for automatic drill down purposes. In the example, a particular business metric 1010 is involved. Automatic drill down can be applied when a business metric is being monitored (e.g., to go beyond the base metric specified in a rule) or when exploring reasons behind the metric (e.g., when displaying a story page having a drill down synopsis about the metric).

In the metric framework, various dimensions are provided that allow drill down to better understand the data (e.g., to place a population into groups, sometimes called "segments"). The same base business metric observation (e.g., voluntary termination rate) can be determined for the segment population (e.g., the metric is calculated for respective sub-populations that are segments divided according to a dimension). In practice, it is often helpful to know if a particular segment evidences an unusual departure from a target. For example, if 20% of the workforce terminated voluntarily, it is helpful to know that 60% were in the Chicago office. In such a case, the dimension is "office" and the segment is the population in the Chicago office.

In the example, the business metric 1010 is segmented using a plurality of dimensions 1020, 1030, 1040. The resulting segments 1021, 1022, 1029, 1031, 1032, 1033, 1041, 1042, and 1049 can be analyzed to perform automatic drill down.

For example, when detecting business metric conditions, analysis can be limited to the specified base metric 1010 (e.g., a particular domain). However, if desired, detection can also be performed automatically on the segments (e.g., within the domain). An alert can then be constructed for a particular segment. Configuration settings can indicate the available segments or limit the analysis to enumerated segments, or available segments can be considered by default. Segments can be specified by indicating a dimension (e.g., implying segments under the dimension) or listing particular segments explicitly.

In practice, there can be further levels of segmentation (e.g., if there are two Chicago offices). Configuration settings in a rule can indicate how many levels are to be automatically analyzed during construction of alerts (e.g., to limit drilling down to a level specified in a given rule).

Subsequently, when an alert is provided, a user may wish to see the metric as observed for other segments. The data can also be ordered by segment (e.g., to see the top n segments, ordered by termination rate).

Although the business metric 1010 is described as the "base metric," it is possible that the metric descends from a higher level metric 1012, has sibling metric(s) 1014, or the like. For example, an administrator may have access to a broader set of metric classifications, while a user may not wish to see such detail.

Figure 11:
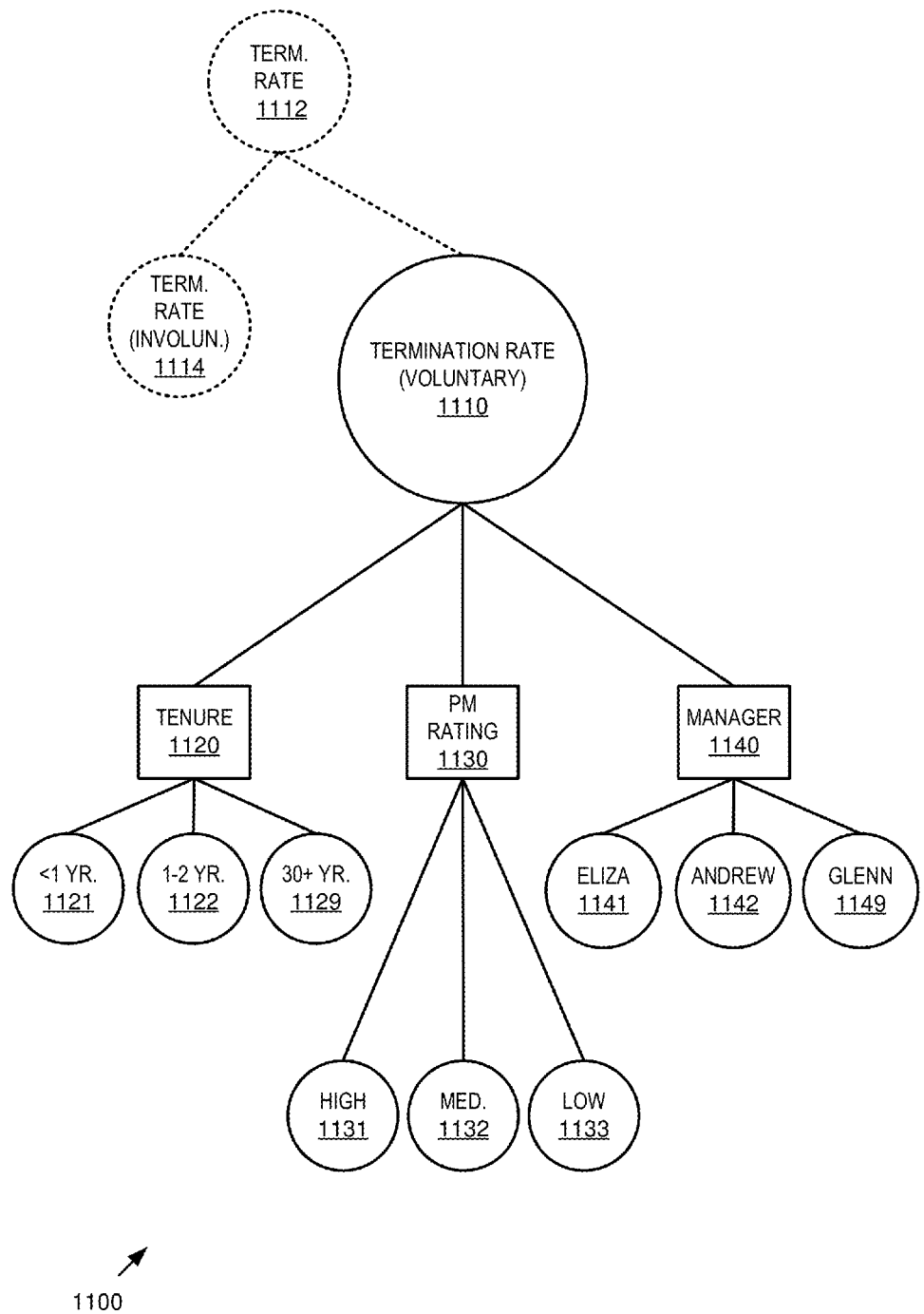
FIG. 11 is a block diagram showing an exemplary implemented data hierarchy used in a metric framework for automatic drill down purposes.

FIG. 11 is a block diagram showing an exemplary implemented data hierarchy used in a metric framework for automatic drill down purposes in a human resources scenario. In the example, voluntary termination rate is the base metric 1110, and tenure 1120, performance rating 1130, and manager 1140 are dimensions having various segments 1121, 1122, 1129, 1131, 1132, 1133, 1141, 1142, and 1149.

Parent metric 1112 and sibling metric 1114 can also be implemented.

When a domain is specified for detecting a given business metric condition, the technologies described herein can automatically drill down to segments of data within the domain. Such drilling down can detect a business metric condition in one or more of the segments.

EXAMPLE 24

Exemplary Business Metric Condition Detection Rules

Figure 12:
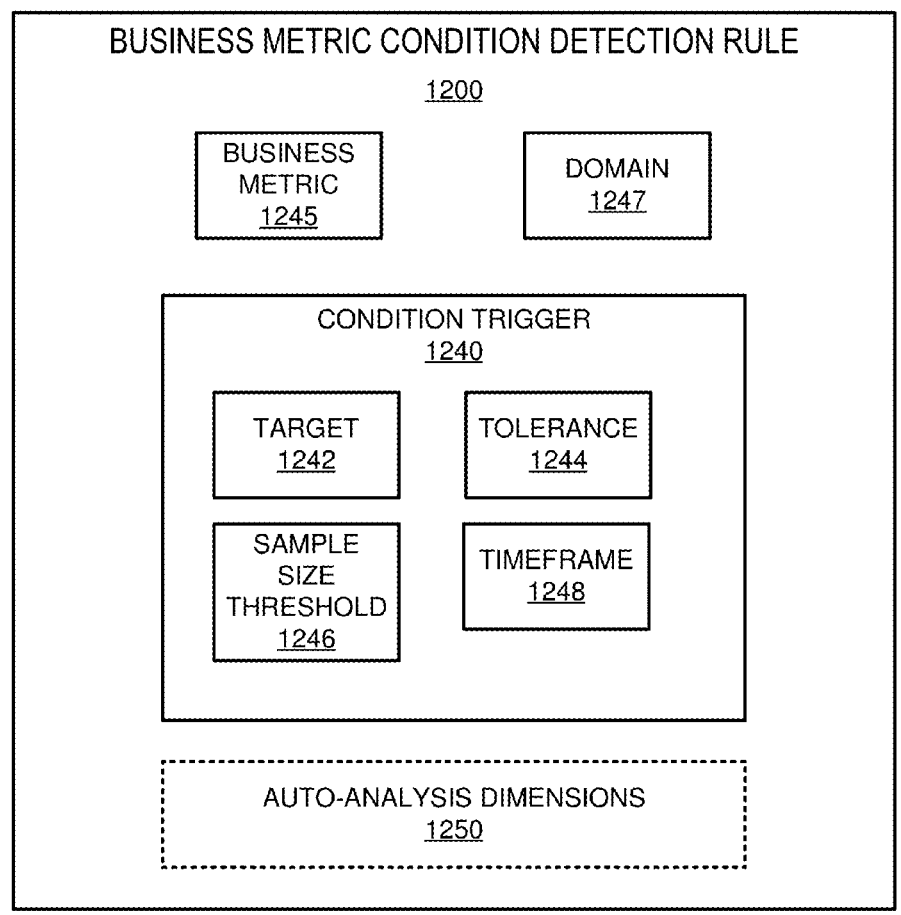
FIG. 12 is a block diagram of an exemplary business metric condition detection rule.

FIG. 12 is a block diagram of an exemplary business metric condition detection rule 1200 that can be used in any of the examples herein.

In the example, the rule 1200 specifies a particular business metric 1245 (e.g., by using an identifier, description, or the like) that is to be monitored. The rule also specifies a domain 1247 that indicates the population for which the business metric is to be monitored.

The business metric condition trigger 1240 generally specifies conditions under which the rule triggers an alert. A target value 1242 (e.g., comparable) can be specified for comparison against the metric as observed in the domain. The target 1242 can take the form of a threshold (e.g., measurements over the threshold are considered to satisfy the rule). Various target types can be supported, including a benchmark target (e.g., to compare against others in the same industry), a prior period target (e.g., to compare against prior periods or the same period last year, etc.), and a hard number. A user can configure the target by adjusting it (e.g., to avoid annoying false positives).

A tolerance value 1244 can also be specified. Such a tolerance 1244 can indicate a buffer above or below the target 1242. If the metric as observed in the domain falls outside the indicated tolerance (e.g., the target value 1242 plus or minus the tolerance value 1244), an alert or special alert can be indicated. For example, a percentage (e.g., 10%) can be specified. If the business metric as observed in the domain exceeds the target 1242 by the tolerance 1244, an alert can be generated, or the alert can be processed specially (e.g., color coded or the like) as described herein.

To avoid statistical anomalies, a sample size threshold 1246 can be specified. If the population size of the domain or automatic drill down segments does not meet the sample size threshold, the population can be ignored (e.g., the condition is not checked). The threshold 1246 can be stored outside the rule 1200 (e.g., a single threshold can be shared with other rules).

A timeframe 1248 can also be specified. Such a timeframe can influence the domain (e.g., to check data from a current period as specified) and can also influence the target (e.g., to compare against data from a previous period, a target derived by observing the previous period can be used). For example, a timeframe of "quarterly" can indicate that data from the current quarter be compared against data from a preceding quarter (e.g., or last year's quarter, etc.).

Automatic drill down settings can also be specified so that the rule checks the metric within segments of the domain (e.g., treating the segments as separate domains) according to the metric framework described herein.

The automatic analysis dimensions 1250 can also be included as part of the rule 1200, and can be used for the resulting story page associated with the alert generated based on the metric condition 1240 and automatic drill down as described herein.

EXAMPLE 25

Exemplary Sample Size Threshold

In any of the examples herein, a sample size threshold can be used when detecting business metric conditions. Consideration of observed business metrics for which the sample size threshold is not met can be filtered out (e.g., they do not generate alerts). Comparison is not needed, and further processing can be avoided (e.g., the condition is not met).

The sample size threshold can be associated with a user, a rule, a business metric or the like.

Such an approach can avoid annoying false positives due to lack of a statistically insignificant sample size.

EXAMPLE 26

Exemplary Periodic Rule Execution

In any of the examples herein, a given rule can be linked to one or more users and set to run on a periodic basis. For example, one manager may wish to receive weekly updates for a set of rules, and another manager may wish to receive monthly updates for a different set of rules. Configuration settings can be changed to alter when a rule is run and to whom the resulting alerts are distributed. Reporting path functionality can indicate that results are to be distributed to those in a reporting path (e.g., a manager, the manager's manager, a vice president of the manager's business unit, and the like).

EXAMPLE 27

Exemplary Business Metric Condition Rule Processing Method

Figure 13:
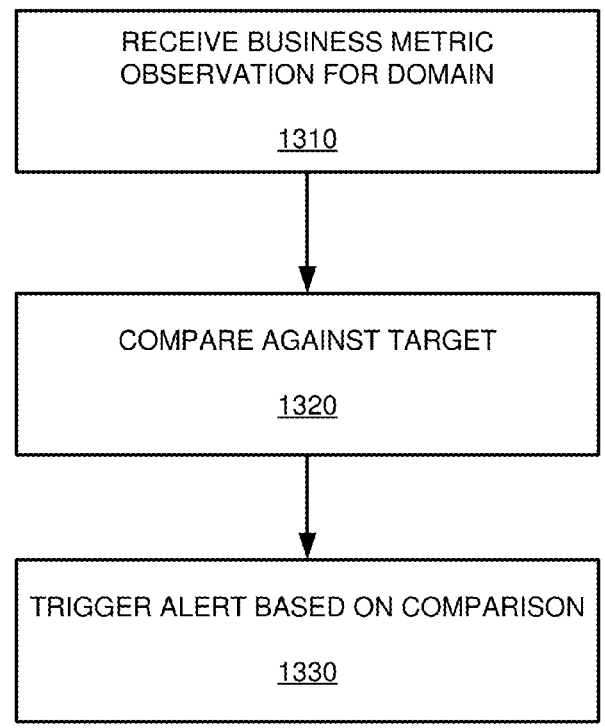
FIG. 13 is a flowchart of an exemplary method of processing a business metric condition detection rule.

FIG. 13 is a flowchart of an exemplary method 1300 of processing a business metric condition detection rule and can be used with any of the rules described herein.

At 1310, a business metric observation for a domain is received (e.g., the business metric for the domain is calculated). As described herein, the domain can be limited to a particular timeframe. When automatic drill down is performed, the business metric may be observed for one or more segments within the metric specified in the rule.

At 1320, the business metric observation is compared against the target. Tolerance can also be taken into consideration. Timeframe can also be considered (e.g., to compare against the prior period, same period last year, etc.). A sample size threshold can also be used as described herein. As described herein, automatic drill down can result in multiple comparisons per rule.

At 1330, an alert is triggered based on the comparison. For example, if the observed business metric exceeds the target, or exceeds the target plus the threshold, an alert can be triggered. Other techniques can be used. For example, the comparison results for a plurality of rules can be ranked, and the top n (e.g., most unfavorable, favorable, or the like) comparison results can be used to trigger respective alerts. The bottom n results can also be presented for purposes of providing context or comparison. The same or similar type of ranking can be used when ordering the alerts as part of a ranked list of alerts.

To prepare for future requests by a user (e.g., to drill down), retrieval of data for automatic analysis dimensions can be done (e.g., the business metric can be observed for the segments relating to the analysis dimensions, and the results can be stored for fast retrieval if desired).

EXAMPLE 28

Exemplary Metric Condition Triggers

In any of the examples herein, a wide variety of metric condition triggers can be supported. Such triggers typically take the form of a target value, tolerance, time frame, and the like. Such triggers typically rely on a comparable against which an observed metric is compared. The trigger can be used to determine whether a particular metric case is indicated by the observed metric as described herein.

EXAMPLE 29

Exemplary Comparables

In any of the examples herein, a wide variety of metric comparables can be supported. Such comparables are sometimes called a "target" herein because they specify a target value against which observed metrics are compared.

Different comparable types can be supported, including specified (e.g., hard) target values and automatically generated target values. Comparable types with automatically generated target values include prior period, past period (e.g., same period last year), enterprise average, industry average, or the like.

EXAMPLE 30

Exemplary Metric Conditions

In any of the examples herein, a wide variety of metric conditions can be supported. When monitoring metric conditions, the metric condition triggers can be used herein. As a result of detecting such a metric condition, it can then be described using natural language. There is thus a parallel between the detected metric condition (e.g., observed attrition rate is over a threshold) and the described metric (e.g., "is too high.")

Conditions that can be detected and described include can include an indication of comparison results (e.g., "too high," "above target," or the like). A degree of the disparity between observation and target (e.g., "significantly," "too," "exceedingly," "slightly," or the like) can also be included. Timing aspects (e.g., "quickly," "gradually," or the like can also be included.

Instead of "high" or "above," conditions can be "low" or "below."

In some cases, it may be desirable to support metric conditions that indicate that a metric is on target (e.g., "stable," "within bounds," or the like).

EXAMPLE 31

Exemplary Domains

In any of the examples herein, domains can be used. For example, a business metric can be observed for a domain that indicates the population (e.g., business enterprise unit, group of employees, or the like) for which the business metric is to be monitored.

Such a domain can be specified in absolute or relative (e.g., in terms of the user) terms. Domains specified in relative terms can indicate what part of the business enterprise hierarchy (e.g., organizational chart, report path, or the like) is to be monitored from the user's perspective (e.g., peer managers, direct reports, managed business units, or other organizational structure). The domain is therefore sometimes called the "structure" of the rule.

The domain can indicate an enterprise business unit or any arbitrary group of employees and can take the form a query terms (e.g., employees in particular office) and can also be based on report path (e.g., employees who report to a particular manager).

In practice, the domain can be specified as a segment (e.g., dimension name and dimension value) (e.g., "Manager: Eliza Hunter").

When constructing a natural language description for the domain, it can be phrased in terms of a group (e.g., "your group").

EXAMPLE 32

Exemplary Organizational Perspective Information

In any of the examples herein, a natural language engine can accept organizational perspective information for a given user as input and be configured to describe occurrences of the business metric conditions in natural language from an organizational perspective of the given user. For example, report path information can be stored for a user, and description can be tailored accordingly as described herein (e.g., to indicate that the receiving user is responsible for a group or the like). Other organizational information (e.g., an organizational chart) can be used.

The organizational perspective information can comprise an identification of the population associated with a domain (e.g., an organizational unit) and indicate the population for which a business metric value (e.g., 1615) was observed. The user perspective can also indicate the persona (e.g., identity) of the user to whom the natural language description (e.g., 1660) is directed. The perspective information can also indicate a relationship between the user and the population (e.g., whether the user is a manager of the group, whether the group is a peer group in the same business unit, or the like).

In some cases, the perspective information can be implemented as part of another parameter (e.g., tone). Further, the perspective information can be determined at the time the rule is configured. For example, rules directed to data for a segment that involves a manager who will be receiving the alert can specify that a text template having second person grammar, while rules directed to data for segments of other managers can specify a text template having third person grammar.

EXAMPLE 33

Exemplary Text Template System Generating Natural Language

Figure 14:
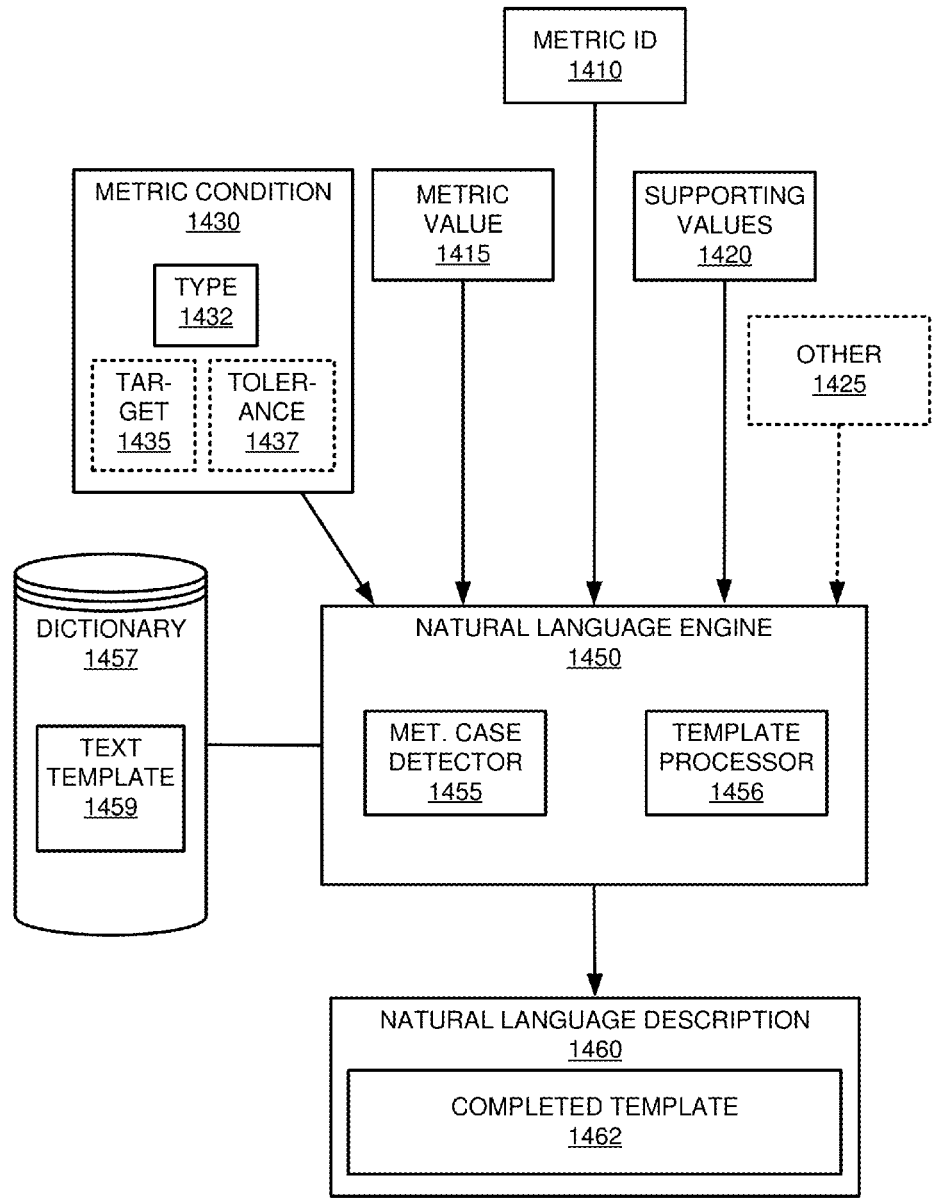
FIG. 14 is a block diagram of an exemplary text template system for generating a natural language description of a business metric condition.

FIG. 14 is a block diagram of an exemplary text template system 1400 generating a natural language description of a business metric condition. Such a system can be used in any of the examples herein involving a natural language description, such as when generating an alert, describing a segment, or the like. Because the system can convert numbers and identifiers into natural language text, it is sometimes called a "translator."

The natural language engine 1450 accepts as input a business metric identifier 1410 that identifies the business metric. For example, a code, label, or description can be used. The business metric value 1415 as observed (e.g., for a population associated with a domain) is also accepted as input. The related domain can also be included (e.g., to indicate which manager's group is being measured). Time frame information can also be included (e.g., the period for which the metric value 1415 was observed).

Supporting values 1420 can also be accepted as input. Such values can indicate the observed population size, how many in the observed population meet the business metric condition criteria (e.g., in the case of termination, those who have left), identifiers of those in the population (e.g., identifiers of those who left), and the like.

The business metric condition 1430 can also be received as input. The type 1432 of comparable used (e.g., target, last period, prior period, control limited range, or the like) can also be included as input. If using a target value 1435 and tolerance (e.g., a percentage) 1437, they can be included. Time frame information (e.g., the time period, if any, used to generate the target) can also be included.

Other information 1425 (e.g., tone or the like) can also be accepted and used to influence generation of the natural language as described herein.

In the example, the natural engine 1450 consults with a natural language dictionary 1457, that includes a plurality of text templates 1459. A text template includes natural language phrases (e.g., "greatly exceeds," "slightly exceeds," "is increasing," "is stable," or the like) associated with respective combinations of the inputs and metric cases (e.g., "above target+tolerance"). Metric cases can be determined by the metric case detector 1455 in the form of a metric case identifier, based on the relationship between the metric value, target, and tolerance, if any. The natural language dictionary 1457 can be configured to support any of a plurality of human languages to support internationalization of the system 1400.

A rule generating an alert can specify other values 1425 to be propagated to the template processor 1456, which chooses a text template 1459 for describing a business metric condition based on the metric case identifier and possible other input factors (e.g., tone, metric identifier, or the like). A table of possible permutations of the values with respective text template entries can be used. Thus the table can serve as a lookup table for providing a text template for a given combination of input factors to the lookup table. The lookup table need not use input factors that vary greatly (e.g., the metric value 1415 itself).

The dictionary can also indicate natural language descriptions of the business metric indicated by the metric identifier 1410. Such descriptions can be in a familiar, conversational tone (e.g., "losing" rather than "voluntarily terminated") to promote ease of understanding and clear communication.

The text template 1459 can be of any arbitrary language and include one or more notations indicating that fields are to be completed from the input values (e.g., supporting values 1420 or the like). Switching between second person and third person descriptions can be accomplished by including such language in the appropriate text templates.

The engine is configured to output a natural language description 1460 of the business metric condition as indicated in the text template 1459, which is chosen based on the inputs. The template processor 1456 can place input values into the template text as indicated by the template.

The text template 1459 can support embellishments to the description 1460. For example, colors can be used to depict severe conditions, subheading detail can be added, and the like.

When describing a segment, portions of the system (e.g., template processor 1456) can be used (e.g., to generate a natural language description of a domain (e.g., "Andrew Thompson's group"), a segment (e.g., "Located in Chicago"), or the like.

EXAMPLE 34

Exemplary Text Template Method of Generating Natural Language

Figure 15:
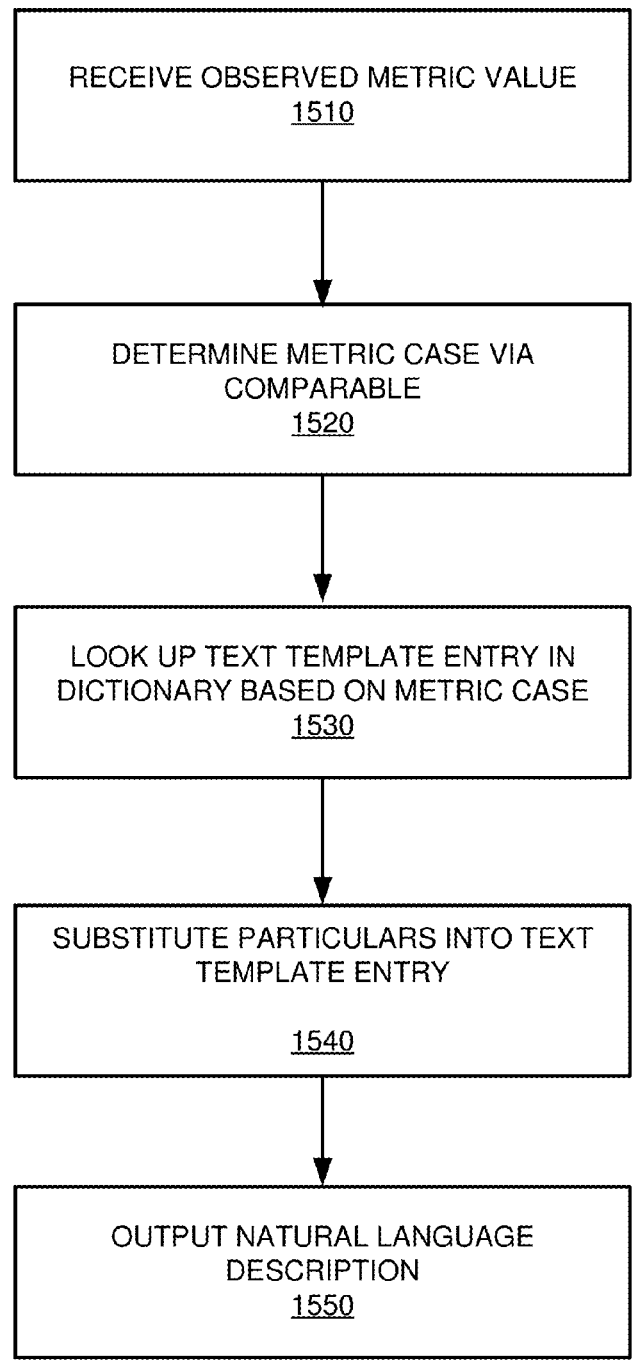
FIG. 15 is a flowchart of an exemplary text template method of generating a natural language description of a business metric condition.

FIG. 15 is a flowchart of an exemplary text template method 1500 of generating a natural language description of a business metric condition and can be used, for example, in conjunction with the system of FIG. 14. Because the method can convert numbers and identifiers into natural language text, it is sometimes called a "translation" process.

At 1510, an observed business metric value is received. For example, a value indicating the business metric as observed in a domain specified in a rule or subsequent automatic drill down can be received. One or more supporting values further quantifying the business metric can also be received.

At 1520, a metric case is determined via an input comparable. As described herein, the comparable can be of a hard target value, last period, past period, enterprise average, industry-specific, or the like. Such a determination can be made by determining what the comparable is (e.g., if it is not explicitly provided, further calculations may be necessary, such as determining historical data) and comparing it to the business metric as observed. A tolerance value, if any, can be applied to the comparable; thus it can be determined whether the metric exceeds the comparable plus the tolerance.

For example, if the observed metric is greater than the comparable value plus a tolerance (e.g., expressed in percentage to be applied to the comparable value), the result "above target+tolerance" is indicated. On the other hand, if the observed metric is greater than the comparable value but within the tolerance, "above target" is indicated.

At 1530, a text template (e.g., an entry in a table or database) is looked up in a natural language dictionary based at least on the metric case. If a template is available for a particular metric case, it can specify appropriate natural language describing the metric case. Such language can be configured to read as desired. For example, if the observed business metric value exceeds the comparable plus the tolerance, the text template can comprise natural language indicating that the target is greatly exceeded.

Additional input factors, such as the metric identifier can be used. In this way, the template can include natural language describing the metric identified by the identifier. Other input factors such as a tone can be used to affect (e.g., switch between) the demeanor of the text (e.g., formal language, causal language, inflammatory language, or the like).

Other input factors can determine whether the text is in second person or third person (e.g., "Your" versus "[Dimension Value]'s"), or the like. Thus, a value indicative of a desired perspective can be received, and based on the value, choosing between text template entries phrased in a second person perspective and text template entries phrased in a third person perspective can be implemented.

Other input factors can indicate a desired human language, and text template entries can be chosen in the indicated language.

Looking up the text template can additionally be based on the business metric identifier itself. Thus the template can be tailored to the particular metric and use familiar natural language to describe it.

The text template can include one or more fields for completion. For example, fields in the text template entry can indicate that supporting values or other information is to be embedded into the text at indicated locations. For example, field notations indicated by special text characters can be used to indicate a field and a field identifier.

The text template include a natural language description in headline format (e.g., natural language complete sentence) as described herein and describe the business metric condition as indicated with relation to the comparable and a tolerance, if any. A subheading providing further information about the metric condition can be included. For example, supporting values can be embedded in such a subheading, with the headline remaining free of such values.

At 1540, the text template entry is completed via the one or more supporting values. In this way, particulars are substituted into the text template entry. For example, a text template such as, "[col 3] of [col 2] people left" can be transformed into "7 of 40 people left" via supporting values "7" (e.g., those people who satisfy the criteria) and "40" (e.g., a headcount) for col 3 and col 2, respectively At 1550, a natural language description of the condition of the business metric comprising the completed text entry is output. The description can then be provided (e.g., distributed, displayed, or the like) to a user for consideration as part of an alert as described herein.

EXAMPLE 35

Exemplary Text Templates

In any of the examples herein, text templates can be stored in a table comprising a plurality of text templates. Such templates can be organized for look up by business metric and metric case. Other lookup factors (e.g., tone, perspective, or the like) can be used.

A subset of the text templates can be associated with a metric case indicative of exceeding a target and a threshold. Such text templates can include more urgent language, contain color information designating language to be depicted in a color denoting urgency, or the like.

For those text templates associated with a metric case of exceeding a comparable value plus a tolerance, the text template can comprise natural language indicating that a target is greatly exceeded.

For those text templates associated with a metric case comparing against a prior period, the text template can comprise natural language describing comparing against a prior period.

For those text templates associated with a metric case comparing against an enterprise average, the text template can comprise natural language describing comparing against an enterprise average.

EXAMPLE 36

Exemplary Supporting Values

In any of the examples herein, business metric supporting values can be included when generating a natural language description. Such values can further quantify a business metric. For example, such values can indicate values used to generate the metric. For example, in the case of a percentage, such values can include domain (e.g., population) size and the size of the population meeting the metric criteria (e.g., the number of employees who terminated, the number of employees who completed training, or the like). Other possible supporting values include a percentage increase (e.g., over last period), a percentage by which the metric exceeds a target, a percentage by which the metric exceeds a company average, or the like. Any other arbitrary value that further quantifies the metric can be used. Such values may be of interest to the reader because they can give further clarity and detail about a business metric condition.

For example, if the business metric relates to a termination rate, a supporting value may indicate an actual headcount of employees who terminated.

EXAMPLE 37

Exemplary Metric Case Identifier

In any of the examples herein, metric case identifiers can be used to specify a particular metric case. Such an identifier can be useful when determining which text template to use when describing a business metric condition.

Metric cases identified by such identifiers can include above target, above target plus tolerance, below target, below target minus tolerance, above company average, above company average plus tolerance, above prior period, above prior period plus tolerance, or the like.

A wide variety of other metric cases can be supported. For example, comparisons against a benchmark can result in above a benchmark, below a benchmark, or the like.

Rolling trend metric cases can be supported. For example, a rolling trend (e.g., moving average or the like) comparable can be determined (e.g., trailing four quarter moving average). Metric cases can indicate above the trend, below the trend, or the like.

A statistical control limit range can also be supported. For example, for a rolling trend, a range (e.g., band) of values within a multiple of standard deviations can be determined. Metric cases can indicate above the range, below the range, or the like.

Instead of company average, other organizational units or structures can be implemented. For example, for a team's division, office, or other unit or structure). Metric cases can then indicate above the average, below the average, or the like.

Natural language descriptions tailored to the metric case can be generated, stored in text template, or the like. Resulting descriptions can generally indicate the metric case involved without using the actual identifier.

EXAMPLE 38

Exemplary Alternative System Generating Natural Language

Figure 16:
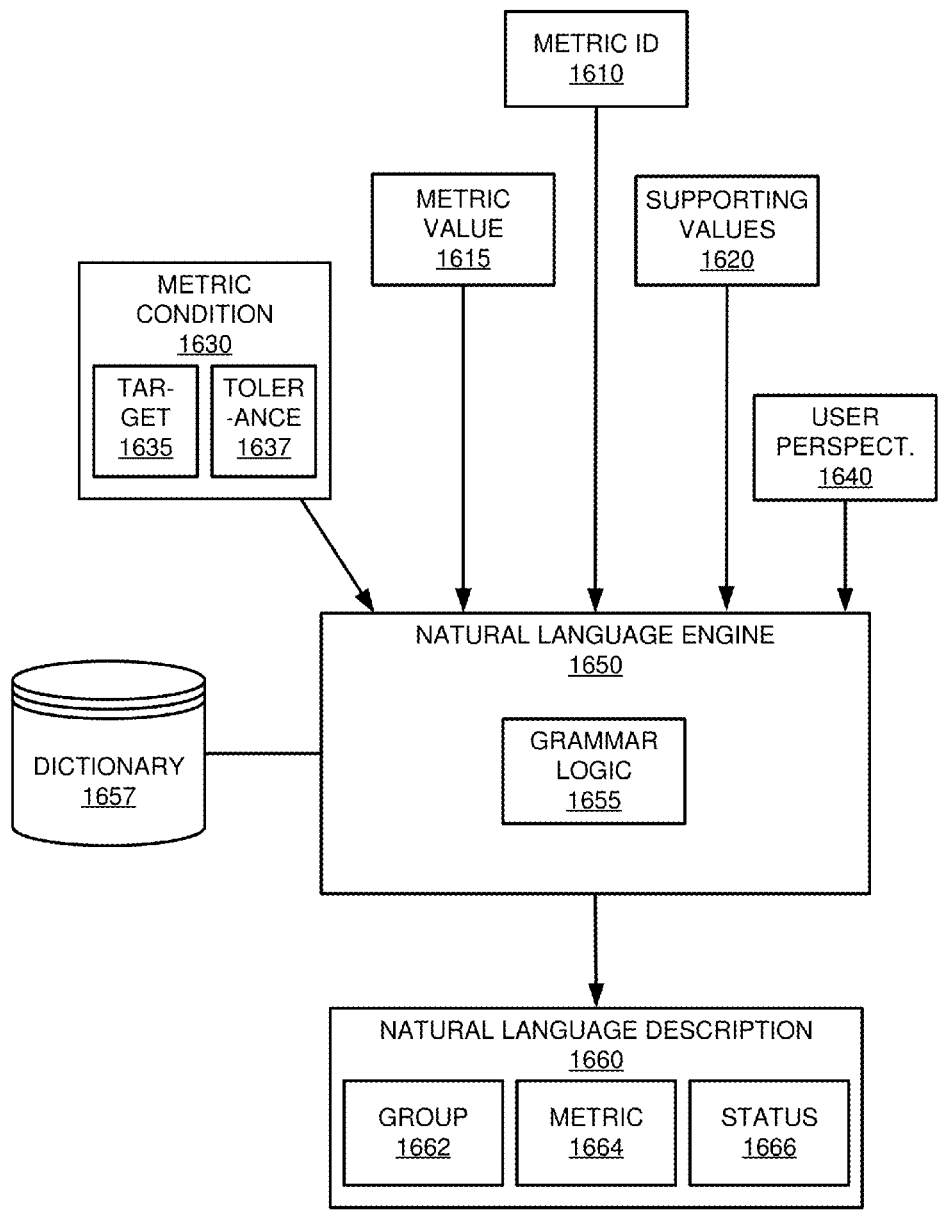
FIG. 16 is a block diagram of an exemplary system for generating a natural language description of a business metric condition.

FIG. 16 is a block diagram of an exemplary system 1600 generating a natural language description of a business metric condition. Such a system can be used in any of the examples herein involving a natural language description, such as when generating an alert, describing a segment, or the like. Because the system can convert numbers and identifiers into natural language text, it is sometimes called a "translator."

The natural language engine 1650 accepts as input a business metric identifier 1610 that identifies the business metric. For example, a code, label, or description can be used. The business metric value 1615 as observed (e.g., for a population associated with a domain) is also accepted as input. Time frame information can also be included (e.g., the period for which the metric value 1615 was observed).

Supporting values 1620 can also be accepted as input. Such values can indicate the observed population size, how many in the observed population meet the business metric condition criteria (e.g., in the case of termination, those who have left), identifiers of those in the population (e.g., identifiers of those who left), and the like.

The business metric condition 1630 can also be received as input. The type of comparable used (e.g., target, last period, past period, control limited range, or the like) can also be included as input. If using a target value 1635 and tolerance (e.g., a percentage) 1637, they can be included. Time frame information (e.g., the time period, if any, used to generate the target) can also be included.

Information 1640 indicating user organizational perspective can also be accepted as described herein.

The natural engine 1650 can also consult with a natural language dictionary 1657, which can include natural language words associated with respective comparison statuses (e.g., "greatly exceeds," "slightly exceeds," "is increasing," "has doubled," "is stable," or the like). The dictionary can be configured to support any of a plurality of human languages to support internationalization of the system 1600. The dictionary can also indicate natural language descriptions of the business metric indicated by the metric identifier 1610. Such descriptions can be in a familiar, conversational tone (e.g., "losing" rather than "voluntarily terminated") to promote ease of understanding and clear communication.

The grammar logic 1655 can support a wide variety of descriptive expression. For example, past, present progressive, and simple present tenses can be chosen based on time frames indicated in the metric condition 1630 and the metric value 1615.

The grammar logic 1655 can also support switching between second person and third person grammar based on the user perspective information 1640. Information in the dictionary 1657 can indicate appropriate words. For example, in English, the word "your" can be used to indicate second person possessive grammar. In other languages, multiple words for second person possessive may be stored to be used depending on gender or other factors. In English "'s" can be used to indicate third person possessive (e.g., "Andrew's group"). Other languages may use different conventions (e.g., "Il gruppo di Andrew") that can be implemented by the logic in conjunction with the dictionary 1657. Grammar templates can store syntax for generically representing and constructing such natural language descriptions.

The engine is configured to output a natural language description 1660 of the business metric condition indicated by the metric value 1615 in light of the metric condition 1630 and the other input values. In the example, the natural language description 1660 is a shown in headline format (e.g., a summary natural language description) comprising a natural language description 1662 of the business group associated with the population, a natural language description 1664 of the business metric indicated by the metric identifier 1610, and a natural language description 1666 of the metric condition status.

Various embellishments can be added to the description 1660. For example, colors can be used to depict severe conditions, a summary graph can be constructed, subheading detail can be added, and the like.

Further, a tone parameter can be supported as described herein. The dictionary 1657 can support such a tone parameter by associating different words with different tones.

When describing a segment, portions of the system (e.g., grammar logic 1655) can be used (e.g., to generate a natural language description of a domain (e.g., "Andrew Thompson's group"), a segment (e.g., "Located in Chicago"), or the like.

EXAMPLE 39

Exemplary Alternative Method of Generating Natural Language

Figure 17:
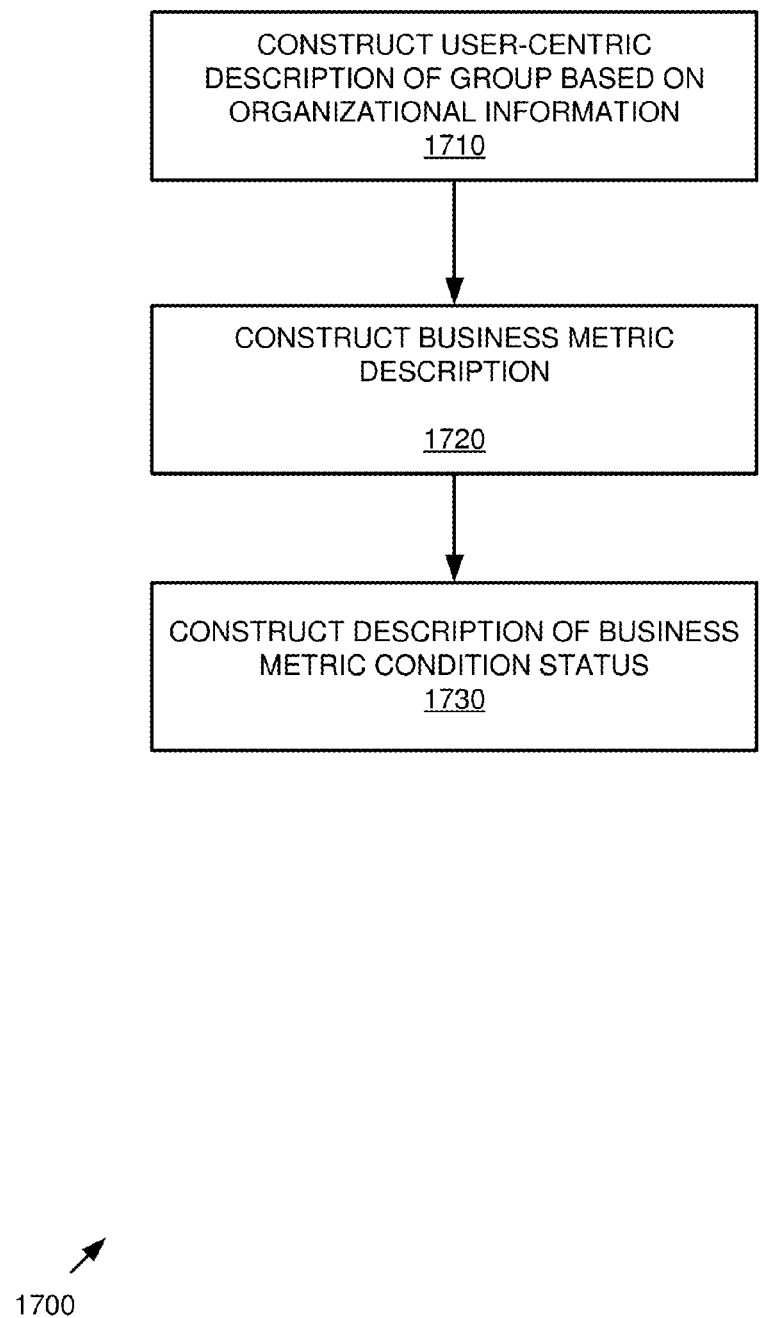
FIG. 17 is a flowchart of an exemplary method of generating a natural language description of a business metric condition.

FIG. 17 is a flowchart of an exemplary method 1700 of generating a natural language description of a business metric condition and can be used, for example, in conjunction with the system of FIG. 16. Because the method can convert numbers and identifiers into natural language text, it is sometimes called a "translation" process.

At 1710, based on organizational information for a business enterprise, a user-centric natural language description of a business enterprise group within the business enterprise for which a business metric has been observed is constructed. For example, the domain specified in a rule or segment can be used to construct a natural language description of the group. The description can switch between second person possessive grammar and third person possessive grammar (e.g., the name of a manager) depending on whether the receiving user manages the group. Thus, the description can be a user-centric description from the perspective of the receiving user. Because the user's identity and location in the organizational structure is used, such a description is sometimes called a "persona description."

At 1720, a natural language description of the business metric is constructed. For example, information such as a business metric identifier or code can be mapped to a natural language description of the business metric. In some cases, the description of the group and the description of the business metric can be intertwined in different ways to facilitate easy reading. For example, "Your group's attrition" can alternately be phrased as "Attrition of your group."

At 1730, a natural language description of a status for a business metric condition as observed for the business enterprise group is constructed. As described herein, the description can switch between tenses.

The natural language descriptions can be combined into a summary natural language description summarizing the business metric condition from a perspective of a user (e.g., to whom the description is directed). As described herein, such a summary description can be in headline format and used as part of an alert triggered by any of the metric monitoring technologies described herein.

Although it is possible to construct a clear natural language description without specific numbers, specific numbers can be used in some cases. For example, a sub-heading may use numbers to further explain a summary description. Such numbers can be combined with template sentences (e.g., associated with the originating rule) to result in a natural language description with numbers (e.g., "114 of 776 people left.").

A summary graph can be included as described herein. Tone can be modified according to a tone parameter as described herein.

EXAMPLE 40

Exemplary Emphasizing Information

In any of the examples herein, color information can be included with a natural language description (e.g., in rich text, HTML, or other format). Such color can be included responsive to determining that the natural language description relates to a severe condition (e.g., the tolerance has been exceeded for an alert). Subsequently, when the description is rendered for the user to view, the description or parts of it (e.g., the predicate portion, verb portion, or both) can be depicted in the chosen color.

For example, red or orange can be used for severe alerts, yellow can be used for warning conditions, and the like.

Alternatively, other emphasizing information (e.g., bolding, italicizing, or the like) can be used.

Such information can be included in a text template. Color data can thus be associated with a natural language description according of a severity category of the business metric condition (e.g., based on the metric case).

As shown herein, a headline or other natural language description need not be of a single color. For example, the portions of the headline relating to the business metric condition (e.g., "losing High-Potential Employees") can be depicted in color, while the remainder of the headline is kept neutral (e.g., grey or black). Thus, a headline can be of a mixed color format.

EXAMPLE 41

Exemplary Business Metric Condition Status

In any of the examples herein, a natural language description of a business metric condition status can be provided to describe the status of a business metric condition. Such a status can be derived from the associated rule. For example, if a business metric has exceeded a target, the status can so indicate (e.g., "is above target.") Such a status can be reserved for those situations in which the metric is above the target plus the tolerance.

Other descriptions need not use "target" language. For example, a statement in present progressive tense (e.g., "is losing high-potential employees") can be sufficient to describe status. However, such a description can still be triggered via a target.

Other status descriptions can provide further color regarding the status, such as a rate of change (e.g., "is climbing slightly").

Other status descriptions can use past tense (e.g., "has completed").

Such status conditions can be generated via natural language templates in combination with comparisons between the observed metric, the target, tolerance, metric case, and the like.

EXAMPLE 42

Exemplary Tone

In any of the examples, a tone parameter can be used to affect natural language construction. For example, a tone setting can indicate direct, conversations, or emphatic tone. When constructing a natural language description, tone can determine the choice of natural language words to describe a status or the like.

Thus, the tone parameter can cause the natural language description to switch between different conversational tones. The tone parameter can be stored as part of the rule that generates an alert, or associated with a user (e.g., so that alerts for a particular user are of a specified particular tone).

EXAMPLE 43

Exemplary Natural Language Descriptions

In any of the examples herein, natural language descriptions can be used to describe alert conditions. Such descriptions can be limited to a single complete sentence. Grammar within the sentence can be chosen to construct a user-centric description as described herein.

As described herein, the description can be switchable between past tense (e.g., "Your group's attrition rate climbed slightly last month," "Most of your group has completed its required training," or the like), present progressive tense (e.g., "Your group is losing High-Potential Employees"), and simple present tense (e.g., "Your group's vacancy rate is above target").

Such descriptions can be localizable to a plurality of human languages, including the user-centric description.

EXAMPLE 44

Exemplary Headline Format

In any of the examples herein, a natural language description can be of headline format, providing a summary natural language description of a business metric condition (e.g., the domain, the metric, and the metric's status). Such a description is sometimes simply called a "headline."

In practice, the headline can be a single, simple complete sentence (e.g., "Your group's turnover is above target") that is easily read and understood. The headline can be constructed from a template that supports further formatting (e.g., HTML formatting, rich text formatting, or the like). If desired, a headline can be a phrase or sentence fragment.

As described herein, headlines can be listed in order of severity and can be incorporated into an alert accompanied by a simple data visualization (e.g., a summary graph).

Such headlines can serve as representations of the alert and can be displayed for further consideration by a user. The user can activate the headline as described herein to perform further exploration of the business metric condition described.

EXAMPLE 45

Exemplary User-Centric Description

In any of the examples herein, the natural language description of a detected business metric condition can comprise a user-centric description of the condition. For example, when sending an alert to a user about a business unit over which the user has responsibility (e.g., as determined by an organizational chart or other configuration information), a second-person possessive pronoun (e.g., "your" in English) can be used. When sending an alert about a different manager's business unit, the possessive form of the owning manager's proper name can be used (e.g., "Andrew's"). Thus, the user-centric description switches from second person grammar to third person grammar (e.g., adding apostrophe s) depending on to whom the alert is directed.

The user-centric description can also otherwise depend on where within the hierarchy the reading manager is. For example, description from an organizational chart perspective of the user to whom the alert is directed can be included (e.g., "Your group").

EXAMPLE 46

Exemplary User Configuration Data

In any of the examples herein, user configuration data can include configuration data for users of the system. For example, indications (e.g., user identifiers) of a plurality of users can be stored, including indications of a particular user.

A natural language engine can include perspective detection logic and can be configured to describe a business metric condition from a perspective of the particular user.

Configuration data can indicate which rules are to be run for which users (e.g., and with what parameters).

If desired, a user can be permitted to customize configuration data. For example, in addition to company-wide alerts, department-wide alerts, and the like, a user can set up a my alerts section and include desired alerts that are configured to the user's liking.

Distribution channels can be assigned to users (e.g., to indicate email addresses, collaboration software identifiers, social network sites, or the like).

Configuration information can be set to be controlled by an administrator or opened to users as desired. As described herein, an alert itself can be used to change configuration information (e.g., to change a target value or the like).

EXAMPLE 47

Exemplary Strategy Bank

In any of the examples herein, a strategy bank can store possible solutions to solving negative business metric conditions. Suggestions from the strategy bank can be displayed on the story page, and one or more links to documents in the strategy bank can be provided on the story page. Responsive to the activation of such links, the documents can be displayed for consideration by the user.

EXAMPLE 48

Exemplary System Implementing Configuration

Figure 18:
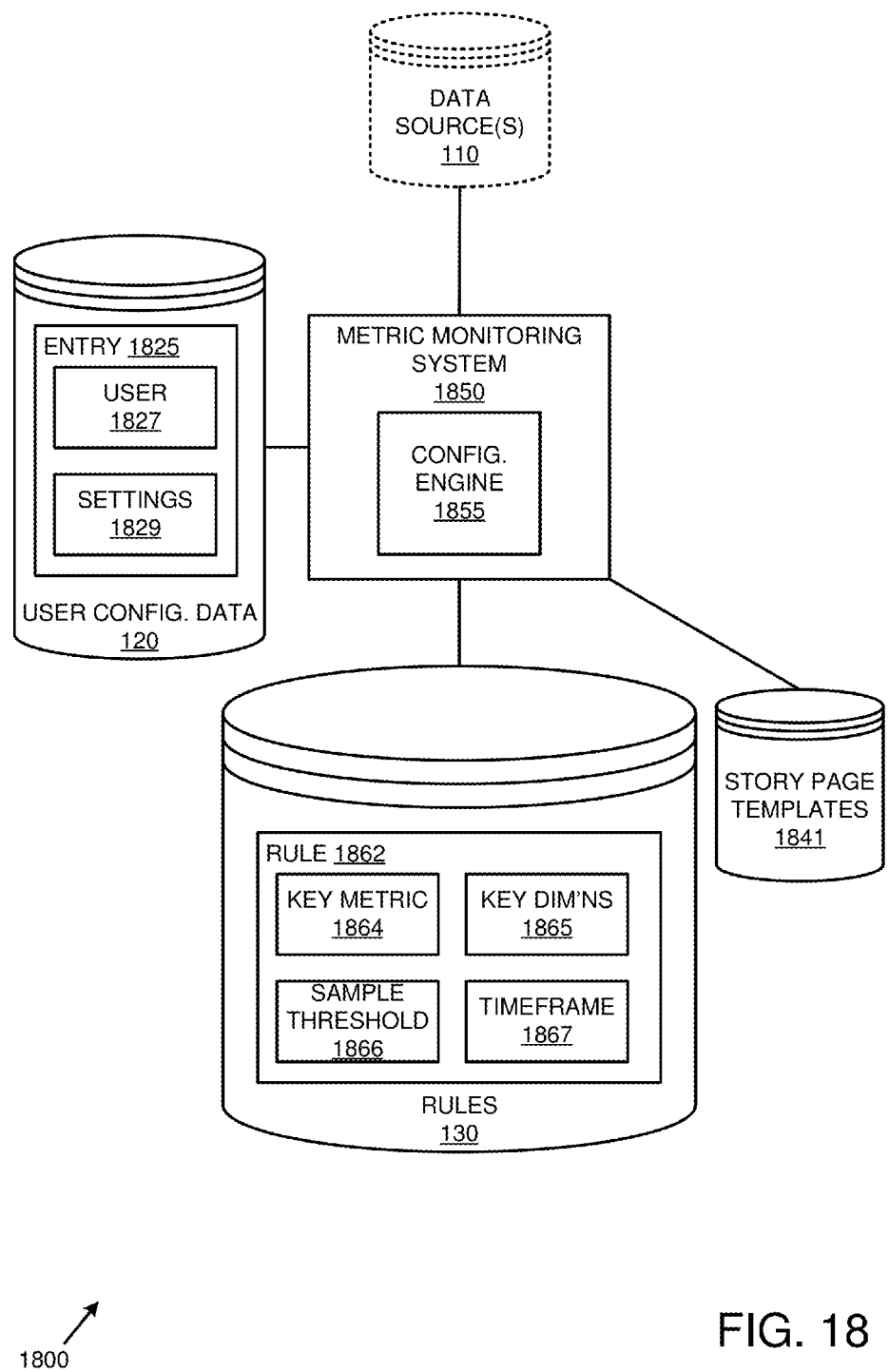
FIG. 18 is a block diagram of a system implementing configuration of rule-based business metric condition alerts.

FIG. 18 is a block diagram of a system 1800 implementing configuration of rule-based business metric condition alerts. For purposes of context, one or more enterprise data sources 110 are shown.

In the example, the monitoring system 1850 monitors the data source 110 and generates alerts for distribution to users.

A configuration engine 1855 is operable to receive directives to configure the user configuration data 120 (e.g., an entry 1825 indicating users 1827 and settings 1829). The rules 130 can also be added, deleted, or edited. An exemplary rule 1862 comprises a key metric 1864, key dimensions 1865 (e.g., for use in automatic drill down as described herein), a sample size threshold 1866, and a timeframe 1867. As described herein, other arrangements are possible. The story page templates 1841 can also be modified to configure the system.

Other information, including a dictionary as described herein, organizational chart data, benchmarks, a strategy bank, and the like can also be configured.

To facilitate rapid deployment, default configuration settings, and sets of settings for target users can be provided with the system 1850.

The configuration engine 1855 can be implemented to support configuration by a mobile device having limited screen real estate.

EXAMPLE 49

Exemplary Method of Configuration

Figure 19:
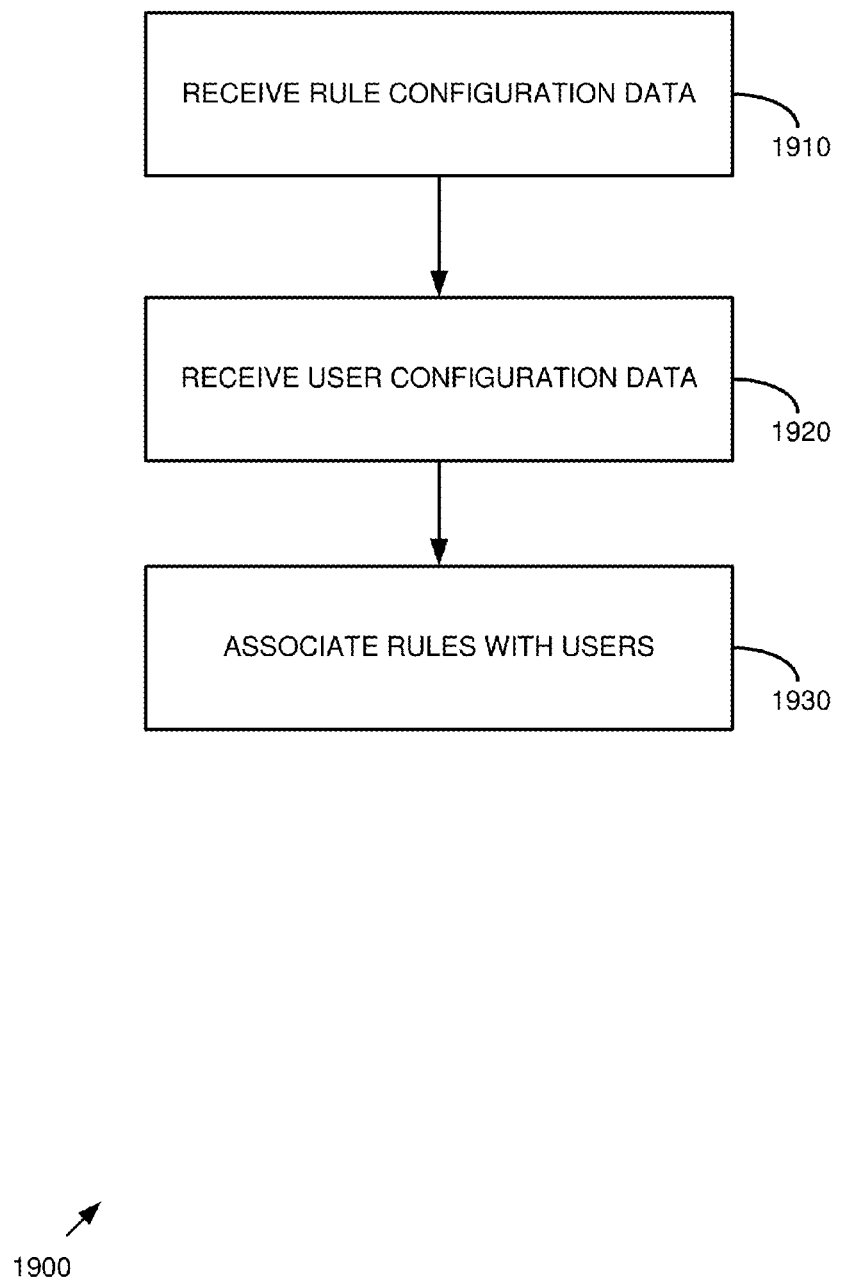
FIG. 19 is a flowchart of an exemplary method implementing configuration of rule-based business metric condition alerts.

FIG. 19 is a flowchart of an exemplary method 1900 implementing configuration of rule-based business metric condition alerts and can be implemented, for example, in the system shown in FIG. 18.

At 1910, rule configuration data is received.

At 1920, user configuration data is received.

At 1930, rules are associated with the users.

Subsequently, at runtime of the system, the configuration is applied. For example, alerts can be distributed to the users according to the rules associated with the users.

EXAMPLE 50

Exemplary Industry-Benchmark-Based Automatic Thresholds

To facilitate detection of outlier or unusual conditions, an industry-benchmark-based automatic threshold can be implemented herein. Such a threshold can be used as a comparable (e.g., target) value. A configuration setting can detect variance from such thresholds without having to explicitly create a rule specifying a particular threshold.

Such a feature can be implemented by receiving an indication of an industry from the business enterprise (e.g., retail, finance, or the like). The system can then access a database of thresholds that are created by statistical analysis of enterprises in the same industry for which business metrics are available. For example, in a cloud computing or software as a service scenario, the business enterprise may be one of a plurality of tenants for which business metrics are available (e.g., the business enterprises are availing themselves of the technologies described herein). Such statistical analyses can be used to determine unusual or outlier data (e.g., outside of a band for a statistical control limit, exceeding a number of standard deviations from a mean, in the top 10%, or the like).

Such a feature can be implemented in a cloud computing scenario because multiple enterprises may be using the same provider to avail themselves of the technologies described herein. The provider thus has access to the data of the enterprises and can conduct aggregation of the data, statistical analyses to determine outlier conditions, or the like.

An alert can then be generated even though no rule was specifically created with the industry-benchmark automatic threshold.

Privacy concerns can be addressed by limiting the circumstances under which automatic thresholds are determined (e.g., not determining an automatic threshold if the industry sample population is one).

EXAMPLE 51

Exemplary Further Implementations

The following implementations of the technologies on various platforms are tailored to a human resources context, but the features described therein can be used with any of the examples herein.

EXAMPLE 52

Exemplary Advantages

The technologies herein can be used by organizations with managers who do not have time to delve into the complexities of their organization's workforce analytics. The technology can be implemented in a mobile-device-ready add-on tool that pulls insights from workforce analytics automatically, and pushes them out to mangers who need them.

Unlike complex analytics packages and competing analytics products, the technology can allow the manager to gain insight without having to dig for it and without needing to spend time interpreting complex tables of data and charts. Analytical insights come right to their inbox, in simple human language, and offer actionable next steps for any critical issues.

The technologies can be used for the modern-day manager whose schedule is constantly filled with meetings and other tasks and has little to no time to use their organization's workforce analytics product to uncover potential issues within their span of control.

The technologies can turn good managers who were busy and pressed for time into great managers who are on top of the critical workforce issues in their organization.

The technologies can be implemented to load quickly and function fluidly on touchscreen tablets and smartphones as well as the desktop.

EXAMPLE 53

Exemplary Headlines

Figure 20:
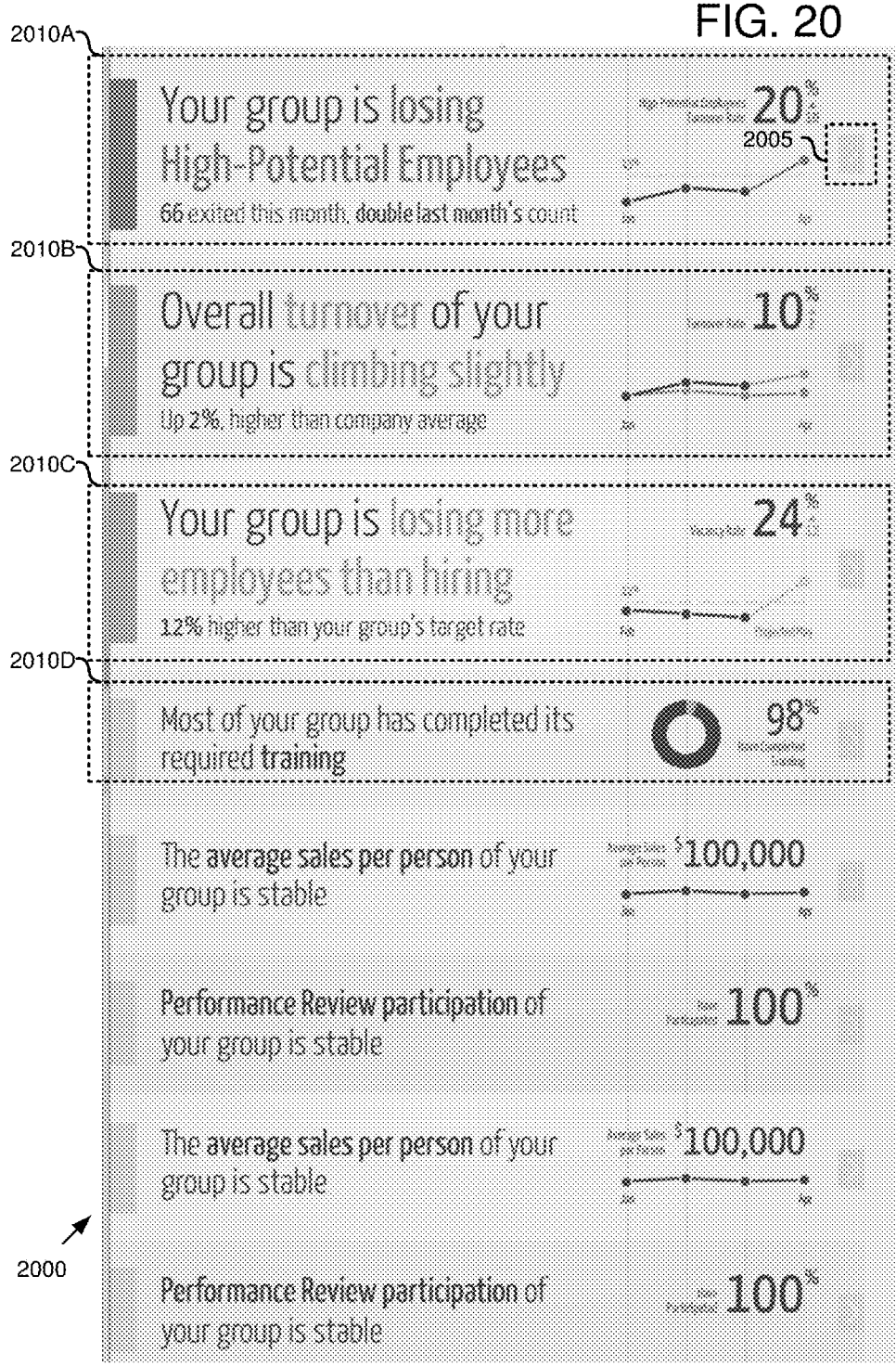
FIG. 20 is a screen shot of an exemplary headline page.

FIG. 20 is a screen shot of an exemplary headline page 2000. Metrics that the manager is interested in are tracked and results are organized in order of severity. Alerts 2010A-D are presented to the manager in plain language to facilitate instant understanding. Navigation to the story page for a given alert can be accomplished by selecting a user interface element 2005 within the alert.

In practice, a variety of other language can be used and can be configured appropriately by altering configuration information as described herein. For example, it may be desirable to display "Your group's vacancy rate is above target—It's 12% higher than our target rate" instead of "Your group is losing more employees than hiring—12% higher than your group's target rate." Such differences can be configured by modifying associated text, tone, or other parameters.

Color coding can be used to indicate a severity category. In the example, the top headline is of a high severity category and is thus portions of it are depicted in a first color denoting urgency (e.g., red or orange), and the next two are of a medium severity category and are thus portions of them are depicted in a second color (e.g., yellow). The remaining headlines are uncolored (e.g., grey). Such a feature can be accomplished by configuring an appropriate rule to detect the condition (e.g., considered to be in a high severity category if a particular metric is detected as being outside of a target plus tolerance) and indicating the color of the text in the rule (e.g., in the text template that generates the natural language description). Or, severity categories can be implied (e.g., due to coloring used in the text template) without calculating explicitly.

In addition, portions of the summary graphs can be depicted in colors to indicate severity.

A manager can immediately see where the hotspots are for their organization and a single tap or click allows the manager to quickly dig deeper for the full story about a particular issue or metric.

EXAMPLE 54

Exemplary Story Page Implementation

Figure 21:
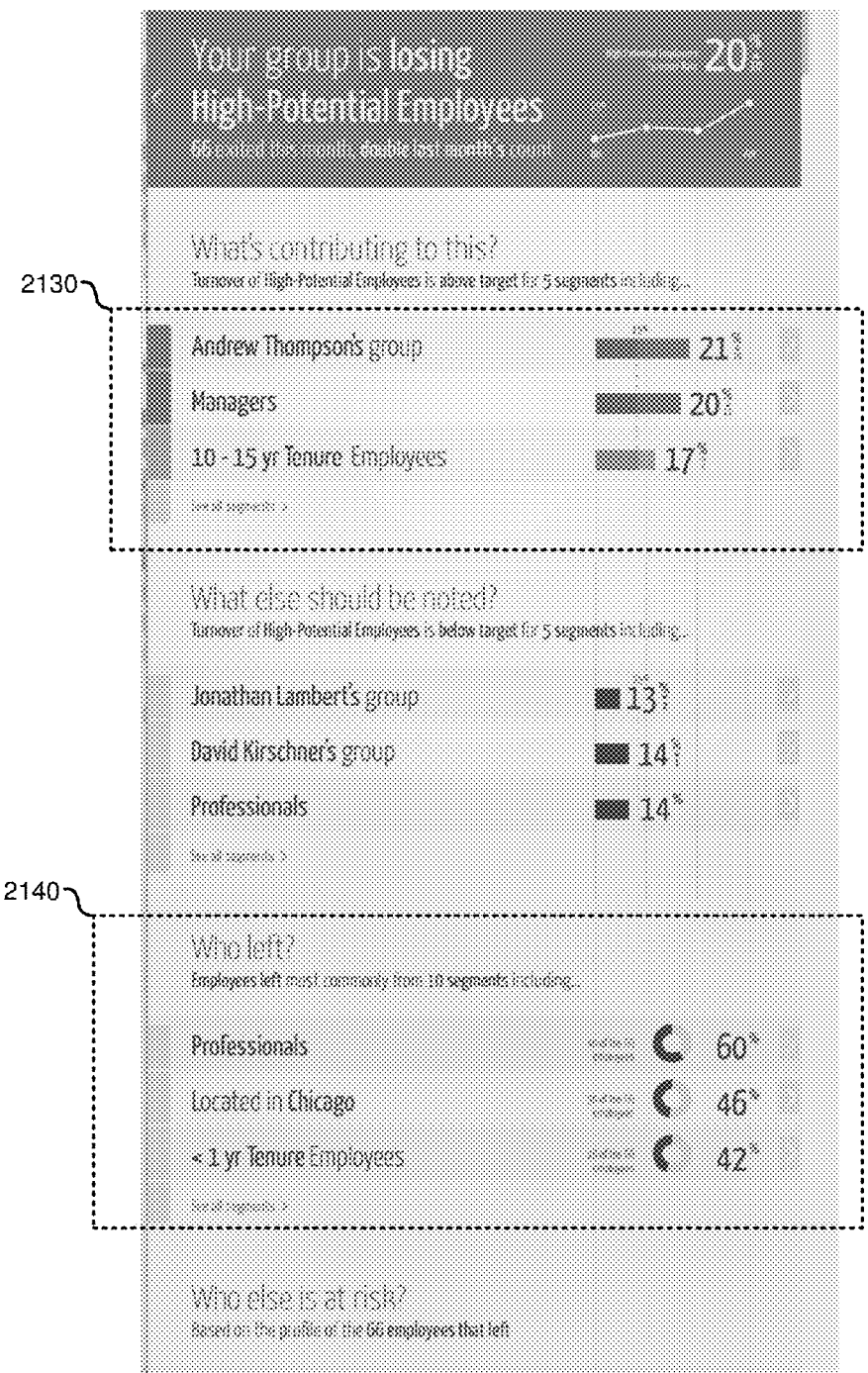
FIGS. 21 and 22 are screen shots of an exemplary story page.
Figure 22:
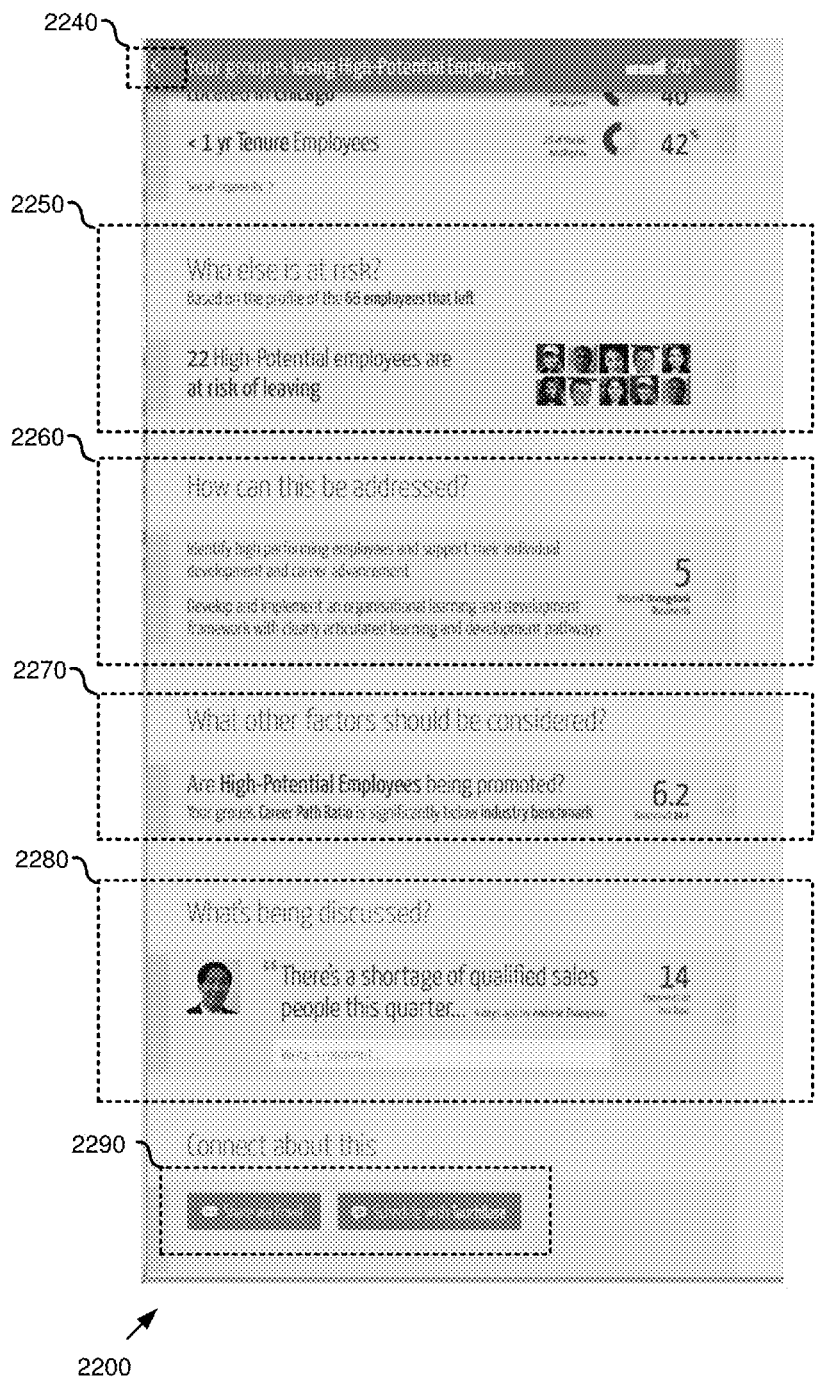

FIGS. 21 and 22 are screen shots showing exemplary portions 2100, 2200 of a story page. Such a story page can be displayed responsive to activation of the associated alert as described herein.

The story page 2100 comprises the associated alert (e.g., with headline language at the top of the page), and a drill down synopsis 2130. In the example, a drill down synopsis of the top 3 and a drill down synopsis of the bottom 3 values of the metric observed within segments are shown. Such a synopsis 2130 can be generated via the automatic drill down feature described herein. The synopsis 2130 can depict values according to severity using color coding. For example, the bars at the left of the description, the bars in the bar graph, and the like can be depicted in red or orange (e.g., if outside of a tolerance), yellow (if only outside a target), or grey (if not outside a target).

Other drill down synopses 2140 can be shown. In the example, instead of a bar graph, a circle graph is shown (e.g., to indicate percentage).

Responsive to activation of the drill down synopsis (e.g., by tapping, flicking, activating an element such as "See all segments," or the like), an expanded version of the drill down synopsis showing further data segments can be displayed as described herein.

The story page 2200 is the same story page 2100 after scrolling. The scrolled page 2200 comprises a compressed version of its associated alert at the top responsive to scrolling down the page. A user interface element 2240 for navigating back to a list of alerts in headline format is also included.

Future risks are also depicted. In the example, a risk synopsis 2250 of the population at risk of leaving is depicted via photographs of the members of the population. The risk synopsis 2250 can function as a drill down synopsis because activating it can expand the list. In the example, a set of photographs of the subset of the population (e.g., employees) is shown in the synopsis. Such employees can be determined by analyzing the conditions under which voluntarily terminating employees terminated. For example, employees from a segment with highest voluntary termination rate can be used.

The story page also comprises possible solutions 2260, which comprises links to a strategy bank along with an indication of a number of documents available therein.

The story page also comprises other factors that should be considered 2270. In the example, the factor listed is based on industry benchmarks. When the template page for the story page for the associated rule is generated, such information can be included, resulting in the displayed factors 2270.

Discussions 2280 can also be displayed as part of the story page. In the example, the beginning part of the discussion is shown with a photograph of the poster. Locating such discussions can be accomplished as described herein.

Options 2290 to share or collaborate can also be included.

EXAMPLE 55

Exemplary Drill Down Synopsis Expanded

Figure 23:
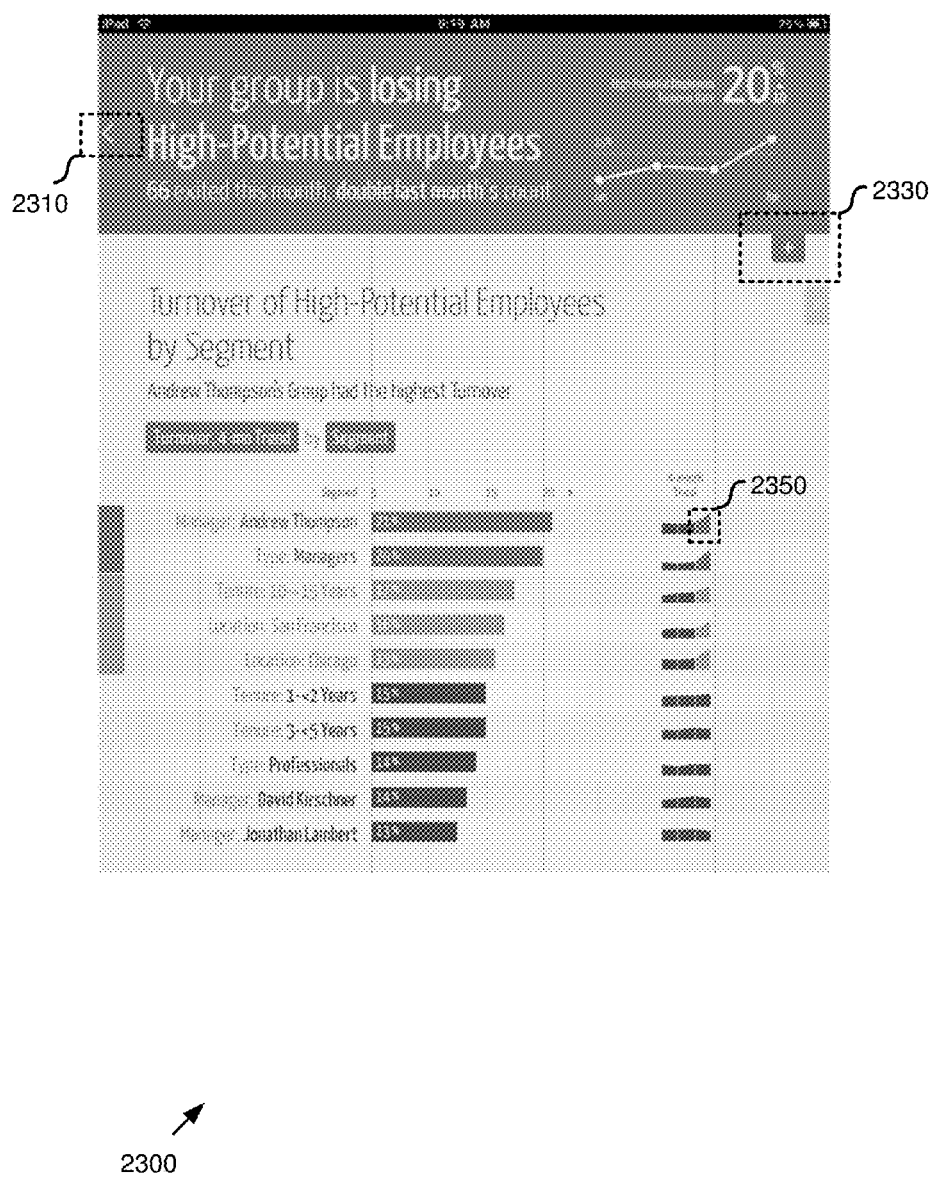
FIG. 23 is a screen shot of an expanded drill down synopsis.

FIG. 23 is a screen shot of an expanded drill down synopsis and can be shown in response to activation of the associated drill down synopsis (e.g., 2130).

A user can further navigate within the data by adding dimensions, changing, or taking away dimensions. For example, a user interface element 2330 can be activated to reveal a dimension picker. The user can thus engage in ad hoc data analysis to explore ideas about causes of the condition.

So, via the story page, an indication (e.g., by a user) to view the business metric by segments other than those shown on the story page can be received. Responsive to such indication can result in an appropriate query can be sent to a database, and the data viewed by requested segment (e.g., a dimension value) can be shown.

The expanded synopsis shows simple trendline graphs for the respective segments, allowing the reader to quickly grasp what is happening.

Color coding can also be used (e.g., red to depict critical situations outside of threshold and tolerance, yellow to depict situations outside of threshold, and the like). Such color coding can be applied to the text for the segment, the bar line for the segment, or the section 2350 of the trendline graph that falls outside of bounds.

A user interface element 2310 for navigating back to the story page can also be included.

Figure 24:
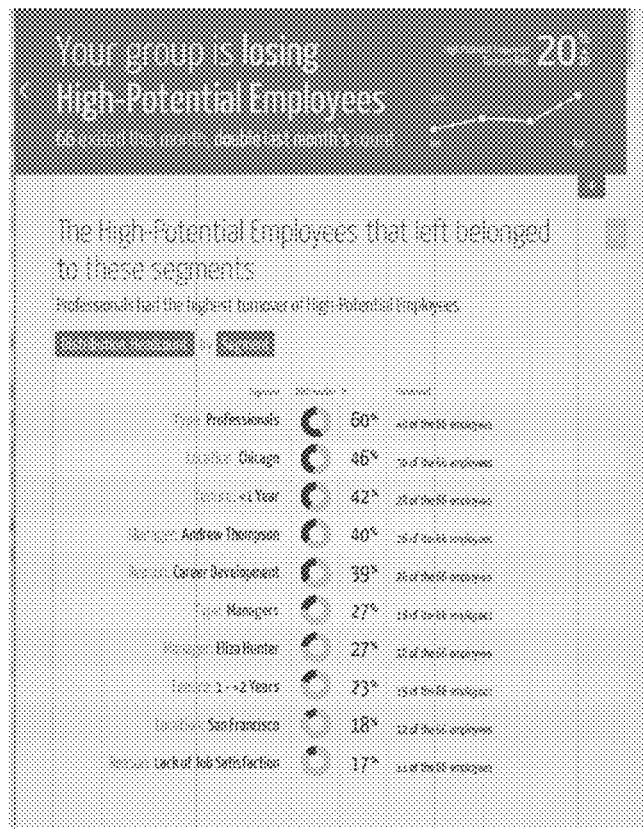
FIG. 24 is a screen shot of another expanded drill down synopsis.
Figure 25:
FIG. 25 is a screen shot of an expanded risk synopsis.

Expanded drill down synopsis 2400 of FIG. 24 (e.g., responsive to activation of 2140) and 2500 (e.g., responsive to activation of 2250) of FIG. 25 can function similarly.

EXAMPLE 56

Exemplary Tablet and Smartphone User Interfaces

Figure 26:
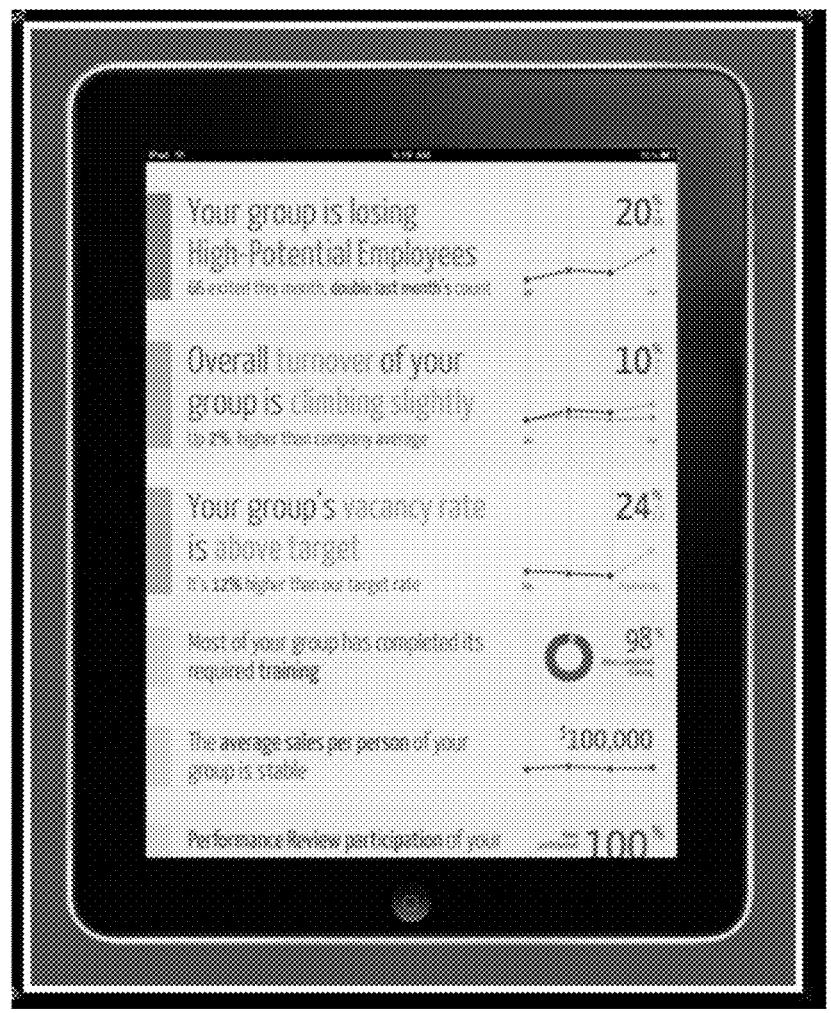
FIG. 26 is a screen shot of a user interface for a tablet device.

FIG. 26 is a screen shot of an exemplary user interface for a tablet device.

Figure 27:
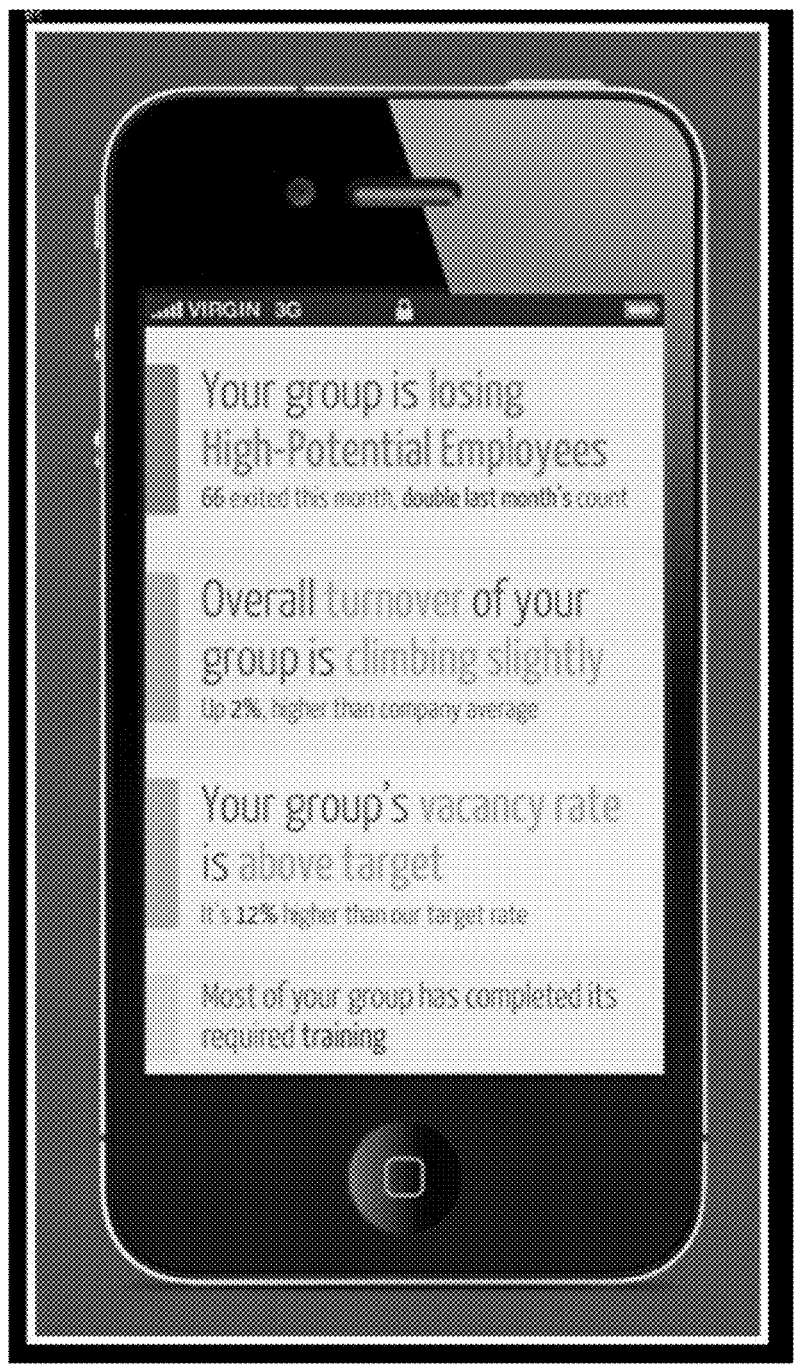
FIG. 27 is a screen shot of a user interface for a smartphone device.

FIG. 27 is a screen shot of an exemplary user interface for a smartphone. In the example, some of the features, such as summary graphs are omitted. The same configuration information (e.g., rules) can be used to generate either the tablet or smartphone user interface (e.g., based on a device type). Thus, the system is configured to switch between descriptions that are suitable for a tablet and descriptions that are suitable for a smartphone while using a single rule for a given description. A desktop computer format can also be supported. Such a feature can be implemented at the server, at the client device, or both in combination.

The technologies herein can be implemented on any of a wide variety of computing devices. In such a case, the display screen can display an alert comprising a natural language description of business metric condition detected for a business metric within a business enterprise as described herein.

In a touchscreen scenario, the display screen is configured to receive an activation of the alert. The computing device can be configured to, responsive to activation of the alert, display a story page comprising further detail about the condition of the business metric. The story page can include a display of the business metric as calculated for a plurality of data segments within the business enterprise.

EXAMPLE 57

Exemplary User Assistive Technologies

Other devices or systems, such as those supporting users with disabilities via user assistive technologies can be used. For example, a screen reader (e.g., JAWS) format can be supported. In this way, the business metric conditions can be easily communicated to a wider user audience.

EXAMPLE 58

Exemplary Content Embedding

The content provided by the technologies described herein can be displayed or embedded directly or indirectly into another electronic document. Documents such as email, word processing, spreadsheet, presentation software documents, PDFs, or the like that have particular format requirements can be supported.

EXAMPLE 59

Exemplary Summary Graph Expansion

Figure 28:
FIG. 28 is a screen shot of an exemplary user interface showing summary graph expansion.

FIG. 28 is a screen shot of an exemplary user interface 2800 showing summary graph expansion. In any of the examples herein, the summary graph can support activation to provide an expanded version of the graph as described herein.

For example, responsive to activation of the graph (e.g., by clicking or tapping the graph), the graph can expand (e.g., an expanded version of the graph the summary graph is displayed) to provide a further detailed view. Such an expanded view can include more data points, show the target metric value, company average, industry average, increased amount, or the like. The expanded view can display the same headline shown for the metric (e.g., for the summary graph) or an abbreviated version (e.g., the metric name).

The expanded version can include a natural language description of a relative trend amount over a prior period (e.g., "doubled over the last month"). A specific trend amount over a prior period can be displayed (e.g., "15%"). An increase can be displayed proximate to the current value (e.g., the increase can be displayed as a subscript of the current value). Other graphic indicators (e.g., up triangle to indicate increase) can be used.

The expanded view can be implemented as a popup user interface element.

EXAMPLE 60

Exemplary Collaboration Sidebar

Figure 29:
FIG. 29 is a screen shot of an exemplary user interface showing a collaboration sidebar for an alert.

FIG. 29 is a screen shot of an exemplary user interface 2900 showing a collaboration sidebar that can be used for any of the alerts described herein. In the example, the sidebar is shown at the left side of the alert. Responsive to activation by the user (e.g., via a swipe, flick, or other gesture on the displayed alert), the sidebar can be displayed, or it can be present by default.

Then, responsive to activation of a user interface element on the collaboration sidebar, the alert can be shared with a recipient.

Sharing can be accomplished via email or collaboration software. For email, a popup can be displayed that is pre-populated with the formatted headline, associated image, and subject line. The user can enter the name of the recipient(s), change the subject line, and enter a message. A receiving user can then review the alert and supplemental content, if any, supplied by the sender.

For collaboration software, the user can select the intended recipient and enter the subject line.

EXAMPLE 61

Exemplary Target Adjustment Via Alert

Figure 30:
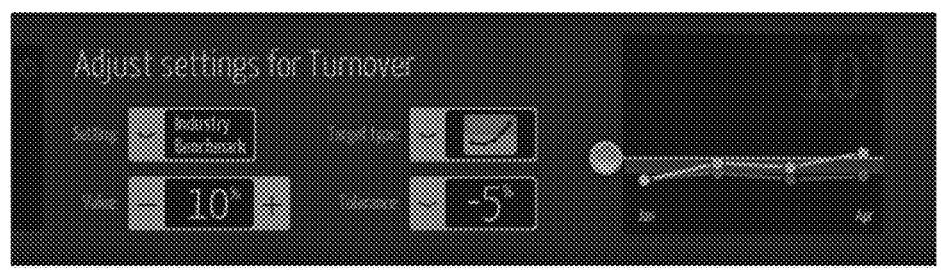
FIG. 30 is a screen shot of an exemplary user interface showing adjustment of target settings for a metric.

FIG. 30 is a screen shot of an exemplary user interface 3000 showing adjustment of a target via an alert and can be used with any of the displayed alerts described herein.

Responsive to a gesture or other activation on an alert, the user interface 3000 can be displayed for adjusting a target setting for the alert. The user interface can be used to adjust a target setting for the alert (e.g., the rule that triggered the alert). The interface allows quick access to a target setting mechanism for a given metric. The interface can allow display of the relevant band shading (e.g., based on benchmark percentage values). Supported target setting mechanisms (e.g., target type, target value, tolerance values, etc.) can be accessed via the interface.

For example, via the interface, an indication to change a tolerance value for an alert can be received. The tolerance is then changed in configuration information. Subsequent executions of the associated rule use the changed tolerance value.

EXAMPLE 62

Exemplary Online Analytical Processing

In any of the examples herein, online analytical processing (OLAP) can be used as a tool to explore data sources (e.g., typically data base tables combined by joins, unions, or the like). In practice, online analytical processing involves multi-dimensional analytics, dimensional models, star schemas, snowflake schemas, data cubes, pivot tables, or the like.

An online analytical processing session can be based on a story page or alert, which specifies data sources and possible dimensions and segments for further exploration.

Upon activation of an appropriate user interface element (e.g., in a story page), an online analytical processing session begins. The session can then support navigation within the data (e.g., adding or removing certain dimensions, drilling down, slicing and dicing, consolidating data via rollups and aggregation, and the like). Thus, the technologies allow ad-hoc navigation throughout the data. In the case of warehoused data such as a data cube, the user can navigate the data throughout the cube. However, cubeless navigation can also be supported.

EXAMPLE 63

Exemplary Computing Systems

Figure 31:
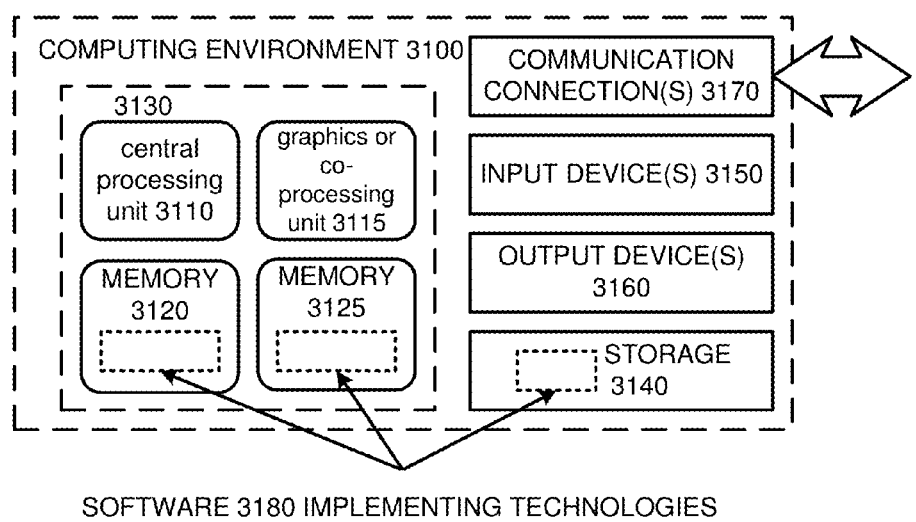
FIG. 31 is a diagram of an exemplary computing system in which described embodiments can be implemented.
Figure 32:
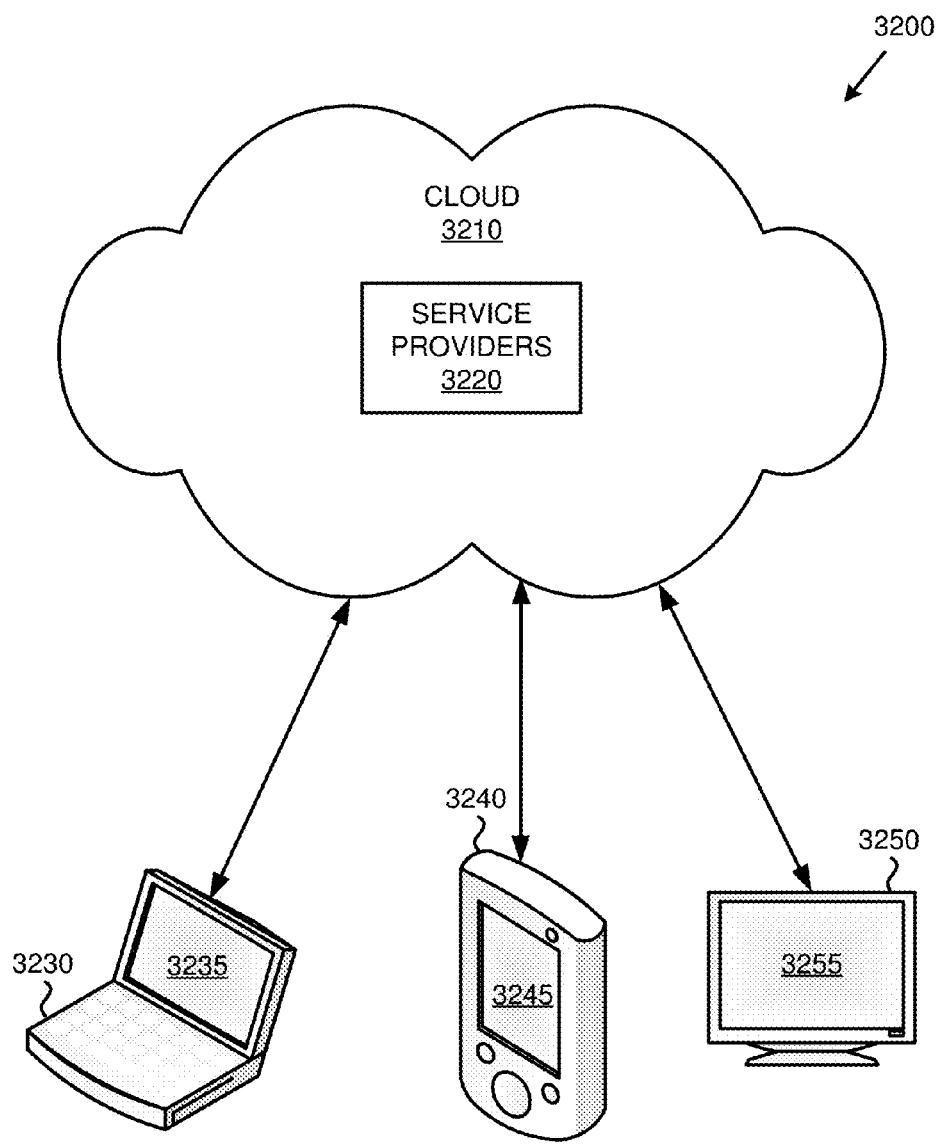
FIG. 32 is an exemplary cloud-support environment that can be used in conjunction with the technologies described herein.

FIG. 31 illustrates a generalized example of a suitable computing system 3100 in which several of the described innovations may be implemented. The computing system 3100 is not intended to suggest any limitation as to scope of use or functionality, as the innovations may be implemented in diverse general-purpose or special-purpose computing systems.

With reference to FIG. 31, the computing system 3100 includes one or more processing units 3110, 3115 and memory 3120, 3125. In FIG. 31, this basic configuration 3130 is included within a dashed line. The processing units 3110, 3115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 31 shows a central processing unit 3110 as well as a graphics processing unit or co-processing unit 3115. The tangible memory 3120, 3125 may be volatile memory (e.g., registers, cache, RAM), non-volatile memory (e.g., ROM, EEPROM, flash memory, etc.), or some combination of the two, accessible by the processing unit(s). The memory 3120, 3125 stores software 3180 implementing one or more innovations described herein, in the form of computer-executable instructions suitable for execution by the processing unit(s).

A computing system may have additional features. For example, the computing system 3100 includes storage 3140, one or more input devices 3150, one or more output devices 3160, and one or more communication connections 3170. An interconnection mechanism (not shown) such as a bus, controller, or network interconnects the components of the computing system 3100. Typically, operating system software (not shown) provides an operating environment for other software executing in the computing system 3100, and coordinates activities of the components of the computing system 3100.

The tangible storage 3140 may be removable or non-removable, and includes magnetic disks, magnetic tapes or cassettes, CD-ROMs, DVDs, or any other medium which can be used to store information in a non-transitory way and which can be accessed within the computing system 3100. The storage 3140 stores instructions for the software 3180 implementing one or more innovations described herein.

The input device(s) 3150 may be a touch input device such as a keyboard, mouse, pen, or trackball, a voice input device, a scanning device, or another device that provides input to the computing system 3100. For video encoding, the input device(s) 3150 may be a camera, video card, TV tuner card, or similar device that accepts video input in analog or digital form, or a CD-ROM or CD-RW that reads video samples into the computing system 3100. The output device(s) 3160 may be a display, printer, speaker, CD-writer, or another device that provides output from the computing system 3100.

The communication connection(s) 3170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 64

Exemplary Cloud-Supported Environment

In example environment 3200, the cloud 3210 provides services for connected devices 3230, 3240, 3250 with a variety of screen capabilities. Connected device 3230 represents a device with a computer screen 3235 (e.g., a mid-size screen). For example, connected device 3230 could be a personal computer such as desktop computer, laptop, notebook, netbook, or the like. Connected device 3240 represents a device with a mobile device screen 3245 (e.g., a small size screen). For example, connected device 3240 could be a mobile phone, smart phone, personal digital assistant, tablet computer, and the like. Connected device 3250 represents a device with a large screen 3255. For example, connected device 3250 could be a television screen (e.g., a smart television) or another device connected to a television (e.g., a set-top box or gaming console) or the like. One or more of the connected devices 3230, 3240, 3250 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 3200. For example, the cloud 3210 can provide services for one or more computers (e.g., server computers) without displays.

Services can be provided by the cloud 3210 through service providers 3220, or through other providers of online services (not depicted). For example, cloud services can be customized to the screen size, display capability, and/or touch screen capability of a particular connected device (e.g., connected devices 3230, 3240, 3250).

In example environment 3200, the cloud 3210 provides the technologies and solutions described herein to the various connected devices 3230, 3240, 3250 using, at least in part, the service providers 3220. For example, the service providers 3220 can provide a centralized solution for various cloud-based services. The service providers 3220 can manage service subscriptions for users and/or devices (e.g., for the connected devices 3230, 3240, 3250 and/or their respective users).

EXAMPLE 65

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method implemented at least in part by a computer, the method comprising:
   for alerts generated by detecting metric conditions in an enterprise data source according to a set of metric condition detection rules, displaying the alerts as an original list of alerts comprising headlines comprising natural language descriptions of respective metric conditions detected for metrics in one or more enterprise data sources, wherein a particular metric condition rule specifies automatic analysis dimensions and the metrics are respectively segmented using a plurality of dimensions;
   receiving an activation of a particular alert out of the original list of alerts;
   responsive to activation of the particular alert, displaying a story page comprising further detail about the metric condition of the particular alert, wherein the further detail comprises a drill down synopsis comprising segments generated by automatic drill down via the automatic analysis dimensions;
   responsive to activation of the further detail, displaying further drill down detail configured to allow free movement within the further drill down detail beyond what was specified in the metric condition;
   subsequently navigating back to the story page responsive to activation of a user interface element; and
   subsequently collapsing the story page responsive to a user activation, wherein collapsing the story page comprises continuing to display the particular alert and displaying the original list of alerts.

2. One or more computer-readable devices comprising computer-executable instructions causing a computing system to perform the method of claim 1.

3. The method of claim 1 wherein:
   the story page comprises a display of a metric associated with the metric condition of the particular alert as observed for a plurality of data segments within the enterprise data sources;
   the data segments contain respective sub-populations of employees of an enterprise represented in the one or more enterprise data sources for which the metric is displayed; and
   the data segments are divided according to a dimension.

4. The method of claim 1 further comprising:
   via the story page, receiving an indication to view the metric by segments other than those shown on the story page.

5. The method of claim 1 wherein:
   the original list of alerts comprises a ranked list of alerts.

6. The method of claim 1 wherein the natural language descriptions of the metric conditions comprise a user-centric description.

7. The method of claim 6 wherein the user-centric description switches from second person grammar to third person grammar depending on to whom directed; and
   a plurality of different conventions for denoting third person for different human languages are implemented.

8. The method of claim 6 wherein the user-centric description comprises a description from an organizational chart perspective of a user to whom directed.

9. The method of claim 1 wherein displaying the particular alert comprises displaying a summary graph depicting the metric condition of the particular alert.

10. The method of claim 9 further comprising:
    responsive to activation of the summary graph, displaying an expanded version of the summary graph.

11. The method of claim 10 wherein:
    the expanded version of the summary graph comprises a natural language description of a specific trend amount over a prior period.

12. The method of claim 1 further comprising:
    displaying a collaboration sidebar for the particular alert; and
    responsive to activation of a user interface element on the collaboration sidebar, sharing the particular alert with a recipient.

13. The method of claim 1 further comprising:
    displaying a user interface for adjusting a target setting for a rule that triggered the particular alert, wherein the user interface superimposes a slider over a graph showing data points for the particular alert, and adjusting the slider adjusts the target setting.

14. The method of claim 13 further comprising:
    via the user interface for adjusting the target setting, receiving an indication to change a tolerance for the particular alert.

15. The method of claim 1 wherein the particular alert originates from analysis of the one or more enterprise data sources with a plurality of metric condition detection rules.

16. The method of claim 1 wherein the metric condition of the particular alert is a negative metric condition, the method further comprising:
    in the story page, displaying an indication of solutions for remedying the negative metric condition.

17. A computing device comprising:
    one or more processors;
    memory;
    a display screen displaying an original list of alerts, generated by detecting metric conditions in one or more enterprise data sources according to a set of metric condition detection rules, comprising headlines comprising natural language descriptions of respective metric conditions detected for metrics within the one or more enterprise data sources, wherein a particular metric condition rule specifies automatic analysis dimensions and the metrics are respectively segmented using a plurality of dimensions, wherein the display screen is configured to receive an activation of a particular alert out of the original list of alerts; and
    the computing device is configured to:
    responsive to the activation of the particular alert, display a story page comprising further detail about the metric condition of the particular alert, wherein the story page is depicted as emanating from the particular alert by animation to emphasize that the story page is expanding upon the alert, other alerts out of the original list of alerts are hidden from view, and said further detail comprises a drill down synopsis comprising segments generated by automatic drill down via the automatic analysis dimensions;

responsive to activation of the drill down synopsis, display further drill down detail configured to allow free movement within the further drill down detail beyond what was specified in the metric condition, wherein a first user interface element can be activated to reveal a dimension picker;

subsequently navigating back to the story pane responsive to activation of a second user interface element; and subsequently collapse the story page responsive to a user activation, wherein collapsing the story page comprises continuing to display the particular alert and displaying the original list of alerts, including the other alerts hidden from view via alert activation.

18. One or more non-transitory computer-readable storage media comprising computer-executable instructions causing a computing system to perform a method comprising:

for alerts generated by detecting metric conditions in an enterprise data source according to a set of metric condition detection rules, displaying the alerts as an original list of alerts comprising headlines comprising natural language descriptions of respective metric conditions detected for metrics within the enterprise data source, wherein a particular metric condition detection rule specifies automatic analysis dimensions, the metrics have associated sample size thresholds to avoid statistical anomalies, and the metrics are respectively segmented using a plurality of dimensions;

receiving an activation of a particular alert out of the original list of alerts;

responsive to activation of the particular alert, displaying a story page comprising further detail about the metric condition of the particular alert, wherein the further detail comprises a drill down synopsis comprising segments generated by automatic drill down via the automatic analysis dimensions, the story page is depicted as emanating from the particular alert by animation to show that the story page is expanding upon the alert, and other alerts out of the original list of alerts are hidden from view;

responsive to activation of the drill down synopsis, displaying further drill down detail configured to allow free movement within the further drill down detail beyond what was specified in the metric condition, wherein a first user interface element can be activated to reveal a dimension picker;

subsequently navigating back to the story page responsive to activation of a second user interface element; and subsequently collapsing the story page responsive to a user activation, wherein collapsing the story page comprises continuing to display the particular alert and displaying the original list of alerts, including the other alerts hidden from view via alert activation.

* * * * *